US008099441B2

(12) United States Patent
Surasinghe

(10) Patent No.: US 8,099,441 B2
(45) Date of Patent: Jan. 17, 2012

(54) SYSTEM AND METHOD FOR CONFIGURABLE TRADING SYSTEM

(75) Inventor: Lakshitha C. Surasinghe, Kotte (LK)

(73) Assignee: Millennium IT (USA) Inc., Cambridge, MA (US)

( * ) Notice: Subject to any disclaimer, the term of this patent is extended or adjusted under 35 U.S.C. 154(b) by 748 days.

(21) Appl. No.: 11/240,157

(22) Filed: Sep. 30, 2005

(65) Prior Publication Data

US 2006/0075396 A1 Apr. 6, 2006

Related U.S. Application Data

(60) Provisional application No. 60/614,695, filed on Sep. 30, 2004.

(51) Int. Cl.
*G06F 7/00* (2006.01)
*G06F 17/30* (2006.01)
(52) U.S. Cl. .................. 707/803; 707/790; 707/802
(58) Field of Classification Search .................. 707/803, 707/790, 802
See application file for complete search history.

(56) References Cited

U.S. PATENT DOCUMENTS

| | | | |
|---|---|---|---|
| 5,212,791 A | 5/1993 | Damian et al. | |
| 5,481,647 A | 1/1996 | Brody et al. | |
| 5,530,863 A | 6/1996 | Hino | |
| 5,570,456 A | 10/1996 | Landolt | |
| 5,701,400 A | 12/1997 | Amado | |
| 5,712,958 A | 1/1998 | Landolt | |
| 5,778,356 A | 7/1998 | Heiny | |
| 6,195,652 B1 * | 2/2001 | Fish | 1/1 |
| 6,374,224 B1 | 4/2002 | Horiguchi et al. | |
| 6,789,103 B1 * | 9/2004 | Kim et al. | 709/203 |
| 6,883,144 B2 | 4/2005 | Zielinski et al. | |
| 7,257,579 B2 * | 8/2007 | Wachholz-Prill | 707/9 |
| 7,353,196 B1 * | 4/2008 | Bobbitt et al. | 705/35 |
| 7,386,549 B2 * | 6/2008 | Bickford et al. | 707/8 |
| 2002/0198876 A1 | 12/2002 | Zielinski et al. | |
| 2003/0050913 A1 * | 3/2003 | Gershfield et al. | 707/1 |
| 2003/0084428 A1 | 5/2003 | Agostini et al. | |

OTHER PUBLICATIONS

Alfred V. Aho, Ravi Sethi, Jeffrey D. Ullman: "Compilers, principles, techniques, and tools", 1986, Addison-Wesley, XP002302329, p. 12, p. 15, p. 13, pp. 389-390.

* cited by examiner

*Primary Examiner* — Tony Mahmoudi
*Assistant Examiner* — Paul Kim
(74) *Attorney, Agent, or Firm* — Cesari and McKenna, LLP; Patricia A. Sheehan

(57) ABSTRACT

A system dynamically integrates into an application program that implements rules for controlling business operations changes in the parameters and parameter groupings that are used by or in conjunction with the rules. The system includes a dynamic business logic rule integrator that provides business logic rules to the application software as executable routines, and a dynamic parameter manager that organizes and manages the parameters. The manager integrates changes to the parameters, groups and/or links the parameters, and makes the parameters available to the rules through a dynamically configurable system database—using a set of static database tables and related dynamically configurable database tables, in which certain database fields or sub-fields correspond to parameters that are used in the rules. The respective database tables and the various fields and sub-fields are established and linked together in accordance with user-defined categories and sub-categories, or "instances." When parameters are added, edited, grouped, re-grouped, or deleted, the dynamic parameter manager updates, creates and/or removes database tables. The revised set of tables is then made available to the rules, and rules utilize the information in the various fields and sub-fields of the tables to control appropriate trading and associated reporting activities.

8 Claims, 46 Drawing Sheets

Create Instruments definition

General Information

Each entity definition will create a corresponding table and a transport message packet. Fields which are created during creation are used to create this message packet and columns of the table.

| General | |
|---|---|
| DefinitionID | |
| Description | |
| Display Name Expression | ≫ |
| Fix Message Tag | |
| Type | Physical |
| Tailor Made Enabled | NO |
| Tailor Made Suffix | |
| Order Book Defs | ≫ |

- General (1806)
- Fields (1807)
- Order Books (1808)

1900, 1902, 1904, 1906

Add    Cancel

FIG. 19

Create Instruments definition

Order Books

Each entity definition will create a corresponding table and a transport message packet. Fields which are created during creation are used to create this message packet and columns of the table.

| Book Name | Description |
|---|---|

General

Fields

Order Books

Remove  Attach

Add  Cancel

FIG. 20

Create Instruments definition

General Information

Each entity definition will create a corresponding table and a transport message packet. Fields which are created during creation are used to create this message packet and columns of the table.

General
- General
- Fields
- Order Books

| General | |
|---|---|
| DefinitionID | |
| Description | |
| Display Name Expression | » |
| Fix Message Tag | |
| Type | Physical |
| Tailor Made Enabled | NO |
| Tailor Made Suffix | |
| Order Book Defs | » |

Add    Cancel

FIG. 21

Create Instruments definition

Fields

Each entity definition will create a corresponding table and a transport message packet. Fields which are created during creation are used to create this message packet and columns of the table.

| | Attach Name | Position | MustFill | InAmend | Hide | sed |
|---|---|---|---|---|---|---|
| 1 | Symbol | 1 | TRUE | TRUE | FALSE | |
| 2 | Instrument ID | 2 | FALSE | TRUE | FALSE | |
| 3 | CUSIP_ISIN | 3 | TRUE | TRUE | FALSE | |
| 4 | Calendar ID | 4 | TRUE | TRUE | FALSE | |
| 5 | Country Code | 5 | TRUE | TRUE | FALSE | |
| 6 | Currency Code | 6 | TRUE | TRUE | FALSE | |
| 7 | Exposure Ratio | 7 | TRUE | TRUE | FALSE | |
| 8 | Instrument Status | 8 | TRUE | TRUE | FALSE | |
| 9 | InternalInstrum.Type | 9 | TRUE | TRUE | FALSE | |
| 10 | Last Trading Day | 10 | TRUE | TRUE | FALSE | |
| 11 | Load ID | 11 | TRUE | TRUE | FALSE | |
| 12 | Market ID | 12 | TRUE | TRUE | FALSE | |
| 13 | Maturity Date | 13 | TRUE | TRUE | FALSE | |

Double click on a field to change its properties

General · Fields · Order Books

Def specific — 2202
Remove — 2206
Attach — 2204
Add · Cancel

| Fields | | |
|---|---|---|
| Categories | ALL ▼ | |
| | | 🗐 Add |
| | | ✗ Cancel |

| Data | Description |
|---|---|
| ☐ ⓔ ADOSA | Adosa ON/OFF flag |
| ☐ ⓔ AOLM | Enable/Disable AOLM |
| ☐ ⓔ Accept Implied Out Orders | Whether to accepts implied out or |
| ☐ ⓢ Account ID | Account ID |
| ☐ ⓔ Account Type | Type of Account associated with |
| ☐ ⓓ Accrued Interest | Accrued Interest |
| ☐ ⓘ Action | Action |
| ☐ ⓢ Active Cash Name | Active Cash Name |
| ☐ ⓢ Active Repo Name | Active Cash Name |
| ☐ ⓓ Adjusted Consideration | Adjusted Condideration |
| ☐ ⓘ Agent Last Trading Day | Agent Last Trading Day |
| ☐ ⓔ Aggressed For Total Qty | Aggressed For Total Qty |
| ☐ ⓔ Aggressive Remaining | Aggressive Remaining |
| ☐ ⓘ Alloc Duration | Duration Available for Allocation |
| ☐ ⓔ Alloc End Ref Date | End of alloc refrenced from thisd |
| ☐ ⓘ Alloc End Ref Days | No. of days from Allocation End Fl |
| ☐ ⓔ Alloc Fill Type | Allocation Fill Type |
| ☐ ⓘ Alloc HL /Warning Interval | Allocation Hard Limit Warning Inte |
| ☐ ⓘ Alloc HL Warning Multiple | Allocation Hard Limit Warning Mul |
| ☐ ⓓ Alloc Lot Size | Allocation Lot Size |
| ☐ ⓓ Alloc Min Fill | Allocation Min Fill |

FIG. 23

| Field Properties | |
|---|---|
| Attach Name | Security Type |
| Description | Security Type |
| Must Fill | YES |
| Hide | NO |
| Used For Rules | YES |
| Used For Group Expression | YES |
| Can Amend | YES |
| Amend On Market Open | YES |
| Transportable | YES |
| Send to Third Party | YES |
| Send Always | NO |
| Stat Field | NO |
| Group | General |
| Default Value | |

OK  Cancel

| Field Properties | |
|---|---|
| Attach Name | |
| Description | |
| Must Fill | |
| Hide | |
| Used For Rules | |
| Used For Group Expression | |
| Can Amend | |
| Amend On Market Open | |
| Transportable | |
| Send to Third Party | |
| Send Always | |
| Stat Field | |
| Group | |
| Default Value | |
| Default Format | |
| OK | Cancel |

| US_BILL | _ □ X |
|---|---|
| US_BILL Creation | |
| For a given definition, fields are grouped and displayed according to the grouping string specified during creation of the definition. | |

ADD

| ⊟ FIX Required | | ∧ |
|---|---|---|
| ✳ Symbol | | |
| ✳ NoSecurityAltID | 1 | |
| ✳ SecurityAltIDSource | ISIN | |
| ✳ Product | GOVERNMENT | |
| ✳ Security Type | EU_SOV | |
| SecuritySub Type | | |
| ⊟ General | | |
| Instrument ID | | |
| ✳ Outright Name | | |
| CUSIP_ISIN | | |
| ✳ Country Code | […] | EU |
| ✳ Issuer ID | […] | EU |
| ✳ Currency Code | […] | EUR |
| ✳ Calendar ID | […] | EU Cash |
| ✳ Load ID | Main | |
| ✳ Internal Instrument Type | INS_BILL | |
| ✳ Market ID | […] | EU Cash |
| Repo Name | | |
| ✳ Hide | | |
| Price Control Fields | | |
| ⊟ Yield | | |
| ✳ Maturity Date | ✓ | |
| ✳ Issue Date | ✓ | Invalid Date Time |
| Auction or Sale Date | ✓ | ∨ |

Add   Cancel

| US_BILL | |  |
|---|---|---|
| US_BILL Creation For a given definition, fields are grouped and displayed according to the grouping string specified during creation of the definition. | | |
| ⊟ FIX Required | | |
| ✱ Symbol | | |
| ✱ NoSecurityAltID | | 1 |
| ✱ SecurityAltIDSource | | ISIN |
| ✱ Product | | GOVERNMENT |
| ✱ Security Type | | EU_SOV |
| SecuritySub Type | | |
| ⊟ General | | |
| Instrument ID | | |
| ✱ Outright Name | | |
| CUSIP_ISIN | | |
| ✱ Country Code | ⋯ | EU |
| ✱ Issuer ID | ⋯ | EU |
| ✱ Currency Code | ⋯ | EUR |
| ✱ Calendar ID | ⋯ | EU Cash |
| ✱ Load ID | | Main |
| ✱ Internal Instrument Type | | INS_BILL |
| ✱ Market ID | ⋯ | EU Cash |
| Repo Name | | |
| ✱ Hide | | |
| Price Control Fields | | |
| ⊟ Yield | | |
| ✱ Maturity Date | ✓ | |
| ✱ Issue Date | ✓ | Invalid Date Time |
| Auction or Sale Date | ✓ | |

[Add] [Cancel]

FIG. 30

Role Dialog

Role ID

Description

Hide

| General Privileges | Group Privileges | Creation Privileges |

Grant

☐ ☐ ☐ ☐ ☐ ☐ ☐ ☐ ☐ ☐ ☐ ☐ ☐

⊖ Others
   Activate Orders In Firm
   Activate Orders In Group
   Activate Own Orders
   Allocate for own trades
   Allocate for trader in firm
   Allocate for trades in group
   Amend order of group
   Amend order of own firm
   Amend own orders
   Cancel All Orders
   Cancel orders of group
   Cancel orders of own firm
   Cancel own orders
   Inactivate Orders In Firm Double click on a column header or row name to check or uncheck a column or a row.

Add    ✗ Cancel

Copy ETC definition

General

Fields

Each entity definition will create a corresponding table and a transport message packet. Fields which are created during creation are used to create this message packet and columns of the table.

Fields

Def specific

| | Attach Name | Position | MustFill | InAmend | Hide | sed for Rules | Def | Transportable |
|---|---|---|---|---|---|---|---|---|
| 1 | Instrument ID | 1 | FALSE | TRUE | FALSE | TRUE | | TRUE |
| 2 | Book Definition ID | 2 | FALSE | TRUE | FALSE | TRUE | | TRUE |
| 3 | Best Ask Price | 3 | FALSE | TRUE | FALSE | TRUE | 0.00 | TRUE |
| 4 | Best Ask Size | 4 | FALSE | TRUE | FALSE | TRUE | 0.00 | TRUE |
| 5 | Best Bid Price | 5 | FALSE | TRUE | FALSE | TRUE | 0.00 | TRUE |
| 6 | Best Bid Size | 6 | FALSE | TRUE | FALSE | TRUE | 0.00 | TRUE |
| 7 | High Price | 7 | FALSE | TRUE | FALSE | TRUE | 0.00 | TRUE |
| 8 | Low Price | 8 | FALSE | TRUE | FALSE | TRUE | 0.00 | TRUE |
| 9 | Last Traded Size | 9 | FALSE | TRUE | FALSE | TRUE | 0.00 | TRUE |
| 10 | Last Traded Price | 10 | FALSE | TRUE | FALSE | TRUE | 0.00 | TRUE |
| 11 | Net Change | 11 | FALSE | TRUE | FALSE | TRUE | 0.00 | TRUE |
| 12 | Last Traded Time | 12 | FALSE | TRUE | FALSE | TRUE | | TRUE |
| 13 | Total Trades | 13 | FALSE | TRUE | FALSE | TRUE | 0 | TRUE |
| 14 | Total Volume | 14 | FALSE | TRUE | FALSE | TRUE | 0.00 | TRUE |
| 15 | OpeningPrice | 15 | FALSE | TRUE | FALSE | TRUE | 0.00 | TRUE |
| 16 | ClosingPrice | 16 | FALSE | TRUE | FALSE | TRUE | 0.00 | TRUE |
| 17 | Settlement Price | 17 | FALSE | TRUE | FALSE | TRUE | 0.00 | TRUE |
| 18 | Symbol | 18 | FALSE | TRUE | FALSE | TRUE | | TRUE |
| 19 | SecurityIDSource | 19 | FALSE | TRUE | TRUE | TRUE | 8 | TRUE |
| 20 | Price | 20 | TRUE | TRUE | FALSE | TRUE | | TRUE |

| mend on Mkt open | mend on Mkt open | Group Expression | Send to Third Party | Category | Send Always | y Format | De |
|---|---|---|---|---|---|---|---|
| TRUE | TRUE | TRUE | TRUE | General | TRUE | NONE | Ins |
| TRUE | TRUE | TRUE | TRUE | General | TRUE | NONE | Be |
| TRUE | TRUE | TRUE | TRUE | Market Data | FALSE | NONE | Be |
| TRUE | TRUE | TRUE | TRUE | Market Data | FALSE | NONE | Be |
| TRUE | TRUE | TRUE | TRUE | Market Data | FALSE | NONE | Be |
| TRUE | TRUE | TRUE | TRUE | Market Data | FALSE | NONE | Be |
| TRUE | TRUE | TRUE | TRUE | Market Data | FALSE | NONE | Pri |
| TRUE | TRUE | TRUE | TRUE | Market Data | FALSE | NONE | Pri |
| TRUE | TRUE | TRUE | TRUE | Market Data | FALSE | NONE | Siz |
| TRUE | TRUE | TRUE | TRUE | Market Data | FALSE | NONE | Pri |
| TRUE | TRUE | TRUE | TRUE | Market Data | FALSE | NONE | Ne |
| TRUE | TRUE | TRUE | TRUE | Market Data | FALSE | NONE | Tot |
| TRUE | TRUE | TRUE | TRUE | Market Data | FALSE | NONE | Tot |
| TRUE | TRUE | TRUE | TRUE | Instrument | FALSE | NONE | Op |
| TRUE | TRUE | TRUE | TRUE | Instrument | FALSE | NONE | Clo |
| TRUE | TRUE | TRUE | TRUE | General | FALSE | NONE | Se |
| TRUE | TRUE | TRUE | TRUE | Execution Report | FALSE | NONE | Sy |
| TRUE | TRUE | TRUE | TRUE | Instrument | TRUE | NONE | Se |
| TRUE | TRUE | TRUE | FALSE | General | TRUE | NONE | Pri |

FROM FIG. 38A

FIG. 38B

| Field Properties | |
|---|---|
| Attach Name | Best Ask Price |
| Description | Best Ask Price |
| Must Fill | NO |
| Hide | NO |
| Used For Rules | YES |
| Used For Group Expression | YES |
| Can Amend | YES |
| Amend On Market Open | YES |
| Transportable | YES |
| Send to Third Party | YES |
| Send Always | NO |
| Stat Field | YES |
| Group | Market Data |
| Default Value | 0.0000000000 |
| Default Format | NONE |

OK    Cancel

SYSTEM AND METHOD FOR CONFIGURABLE TRADING SYSTEM

CROSS-REFERENCE TO RELATED APPLICATIONS

The present application claims the benefit of U.S. Provisional Patent Application Ser. No. 60/614,695, which was filed on Sep. 30, 2004, by Lakshitha Surasinghe for a SYSTEM AND METHOD FOR CONFIGURABLE TRADING SYSTEM and is hereby incorporated by reference.

FIELD OF THE INVENTION

The invention relates generally to data processing systems and, in particular, to systems that implement trading systems.

BACKGROUND INFORMATION

Many businesses use customized application software to control customer transactions, billing, and so forth. The software is designed to implement the particular business plans or rules of the user companies. For a company that provides a monthly service, such as, for example, telecommunications services, customized billing software controls customer billing operations using predetermined parameters that define customer rate plans. The parameters may be, for example, the number of minutes used per month, home calling areas, roaming rates, and so forth.

A financial services company may utilize customized application software to control trading. The application software uses predetermined parameters to determine when and if a particular type of trade is to be made, what market data is generated for customers and/or brokers, and so forth. Companies providing products may also use customized application software to control business operations relating to, for example, the warehousing of raw materials, when, if, and under what terms to sell to various customers, and so forth.

The customized application software operates in accordance with the business plans, or business logic rules, set by the user company. The application relies on a defined set of parameters that the application manipulates in accordance with the business logic rules. In the example of the telecommunications company, the application software controls the rates at which telecommunications customers are billed for particular telecommunication services based on the total number of minutes used per month, the home areas of the respective customers, associated roaming rates, and so forth. The set of parameters that define the billing plans are hard-coded into the application program, and the company can then selectively set associated values for the various parameters to distinguish, for example, between the various billing rate plans offered by the company. The application program thus allows the user company to selectively set the values for the minimum number of minutes that are associated with the various discount rates, and so is forth, without requiring the application program to be re-written and re-compiled.

The application software can not, however, accommodate new business plans that either redefine the existing hard-coded parameters or include new parameters. For example, the application software must be re-written if the telecommunications company discussed above changes its billing plans to charge different rates for minutes used during particular hours. Similarly, the billing application software must be re-written if the company decides to offer new types of services, such as data transmission services, internet services, and so forth. The application software is thus re-written to include the various parameters associated with the new data transmission services and internet services, and/or the parameters associated with the time of day/week billing rates, and so forth.

For a financial services company, the application software is customized to handle the various validation, matching, execution and post-execution activities that the company uses to control the trading of particular types of securities. The application software must be re-written if the company thereafter changes the criteria it uses to, for example, validate a trade, or if the company decides to trade in a new type of security. The various validation, matching, execution and post-execution rules must be revised to include or accommodate the new criteria and/or the new type of security, as well as the revised criteria for the gathering of associated market data.

The updating of complex, customized application software is both time consuming and costly. Further, due to the complexity of the undertaking, the re-writing of the program is prone to errors. The updating must typically be performed by the company that provided the software, which is not only costly but can be delayed since the user must rely on the availability of outside personnel to do the work. In addition, re-writing and re-compiling the code may adversely affect the performance of the application in ways in which are not readily apparent, and thus, the testing of the software is critical. Longer delays are incurred if, after testing, the application code must be re-written to correct errors, and again tested.

The time it takes to update and test and, as applicable, revise and re-test, the application software may cause rather significant delays in the offering of new services and/or billing plans to customers. In response, the customers may change service providers in order to take advantage of the newer plans and/or services offered by competitors. Hidden errors in the re-written application program may also adversely affect customer relations and/or the integrity of the services provided. Such an error may, for example, result in duplicate or incorrect billing for particular services, the inability to track or confirm particular financial transactions, and so forth.

A system that allows a user to revise business logic rules, without requiring the re-writing and re-compiling of the application software is described in the incorporated co-pending application. As discussed below, we have improved the system, by including therein a dynamic parameter manger that organizes and manages parameters that are used in the business logic rules in accordance with the user's underlying business plan, and allows the user to revise the parameters by adding new ones, editing, deleting, grouping and re-grouping existing parameters, and makes the revised set of parameters available for use in the rules, all without requiring the re-writing and re-compiling of the application software.

SUMMARY OF THE INVENTION

The invention is a system that combines into an application program that implements rules for controlling business operations (a) the dynamic integration of changes in the rules governing the business operations, and (b) the dynamic integration of changes in the parameters and parameter groupings that are used by or in conjunction with the rules.

The system includes a dynamic business logic rule integrator ("DBLRI") that essentially provides business logic rules to the application software as executable routines, as described in the co-pending application and repeated below.

The system further includes a dynamic parameter manager that organizes and manages the parameters that are used by the rules. The dynamic parameter manager integrates changes to the parameters, groups and/or links the parameters, and makes the parameters available to the rules through various database tables that are part of a dynamically configurable system database. As discussed in more detail below, the parameter manager manages the parameters using a set of static database tables and related dynamically configurable database tables, in which certain database fields or sub-fields correspond to parameters that are used in the rules. The respective static and dynamic database tables and the various fields and sub-fields are established and linked together in accordance with user-defined categories and sub-categories, or "instances."

When parameters are added, edited, grouped, re-grouped, or deleted, the dynamic parameter manager updates the existing database tables, creates new database tables and/or removes database tables. The revised set of tables is then made available to the rules, and rules utilize the information in the various fields and sub-fields of the tables, to control appropriate trading and associated reporting activities. Similarly, when new rules and revised rules are written, the DBLRI provides new routines and the application software readily incorporates the new and/or revised rules by calling the routines at the appropriate times. The new and/or revised rules, as well as the rules that are unchanged, utilize the information in the revised tables, to readily incorporate therein the new and/or revised set of parameters.

More specifically, the parameter manager presents to a user one or more graphical user interfaces ("GUIs") through which the user selects properties for parameters, groups parameters to form definitions, or categories, links groups of parameters to the categories, and so forth. The GUIs are arranged hierarchically, starting from a set of "base entities" that correspond essentially to the fundamental or broad-based elements and/or operations of the underlying business plan. For example, in a trading system the base entities include markets, instruments, order books, amend orders and so forth. The base entities are thus a way to organize the parameters and associate them with the fundamental elements and/or operations. The system sets the base entities and allows the user to define various parameters, categories and instances with the base entity.

The GUIs allow a user to define new categories within the base entities based on parameters that are required by the base entity and parameters that may be selectively included in the definition of the category by the user. The user similarly defines, and to define sub-categories or "instances" within the various categories. In the example of the trading system, the user may start at the instrument base entity GUI and progress through associated GUIs to define a new type of instrument, such as a new type of bill, which is associated with a customized set of the parameters generally associated with instruments. Further, the user may define an instance of the new type bill, that is, a particular bill that has a set of values for at least the required fields, or parameters, associated with the underlying type of bill. The dynamic parameter manager then updates the database tables, to add the new type of bill to existing instrument database tables and to add the instance of the bill to a newly created database table for the bill type. In this way the dynamic parameter manager makes the new parameters and new parameter groupings available for use by the rules, without requiring the re-writing or re-compiling of the application software.

One of the base entities is a "Field" entity, through which the user adds new parameters to the system, and makes the newly added parameters available for use in categories and instances through the hierarchy of GUIs associated with the other base entities. The system thus allows the user to dynamically update the set of system parameters and the groupings thereof in a managed setting that corresponds to the underlying business plan.

In contrast, known prior systems require the re-writing and re-compiling of the application software to re-define old parameters in and/or add new parameters to the set of hard-coded parameters contained in the application and/or to incorporate these parameters in the business rules.

BRIEF DESCRIPTION OF THE DRAWINGS

The invention description below refers to the accompanying drawings, of which:

FIGS. 17-30 are screens that illustrate various operations of the system of FIG. 1 associated with managing system parameters;

FIGS. 31-39 are screens that illustrate other operations of the system of FIG. 1.

DETAILED DESCRIPTION OF AN ILLUSTRATIVE EMBODIMENT

For completeness, the system is described first in general terms, and thereafter the dynamic business logic rule integrator ("DBLRI") and the dynamic parameter manager are described in more detail.

A. The System

Figure 1:
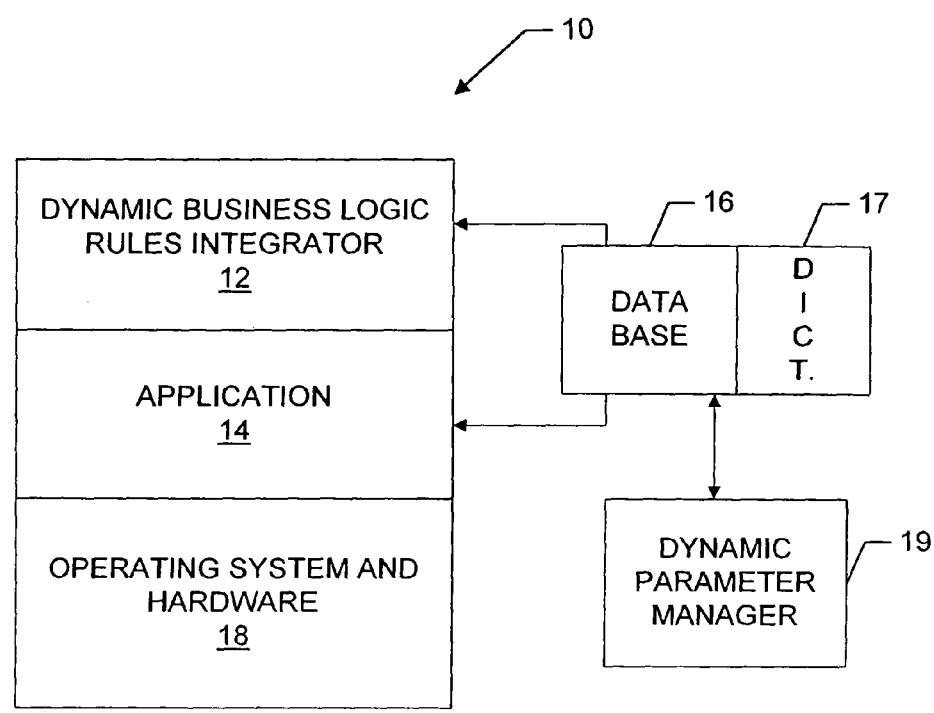
FIG. 1 is a functional block diagram of a system constructed in accordance with the current invention.

Referring now to FIG. 1, a system 10 that incorporates the invention includes a DBLRI 12, which provides to application software 14 various business logic rules in the form of executable routines. The DBLRI and the application software each communicate with a relational database 16, which contains data that are used by the application program. The database is organized into fields and sub-fields (not shown) that correspond to parameters that are included in the business logic rules. A dynamic parameter manager 19 manages the database in accordance with user-defined groupings of parameters to provide the user-defined parameters to the business logic rules through a set of linked database tables. The operations of the dynamic parameter manager are discussed in more detail below with reference to FIGS. 17-39.

The application software 14 communicates in a conventional manner with the database 16, and also with system hardware and software, which are denoted collectively in the drawing by the numeral 18. The system hardware and software 18 provide connections via messaging middleware and/or other communications services to subscriber services that supply data to the database and/or for use in the rules. Further, the system hardware and software operate with the application software to evaluate and/or manipulate the data in accordance with the business logic rules.

As discussed in more detail below with reference to FIGS. 3-15, the DBLRI 12 utilizes a functional language that allows a user to state a business logic rule, or functional program, as a single expression. The DBLRI 12 then translates the expression into a routine that the application software 14 calls and executes at appropriate times. When the underlying business plans change such that certain or all of the business logic rules must be revised or new rules added, the user creates new expressions and/or re-writes affected expressions and the DBLRI 12 produces corresponding executable routines for use by the application software 14. The system 10 can thus dynamically incorporate new or revised business logic rules into the business operations that are controlled by the application software, without requiring the re-writing and re-compiling of the application software.

The database 16 is dynamically configurable. Under the control of the dynamic parameter manager 19, new fields and sub-fields are added to the database and new database tables are created using dynamic schema that link the fields and sub-fields to the various types or categories of rules, as discussed in more detail below.

The operations of the system 10 and, in particular, the DBLRI 12 and the dynamic parameter manager 19 are explained below in terms of one or more examples. The system, the DBLRI and the dynamic parameter manager are not, however, limited to the types of businesses and/or types of transactions that are discussed in the examples.

B. The DBLRI

Figure 2A:
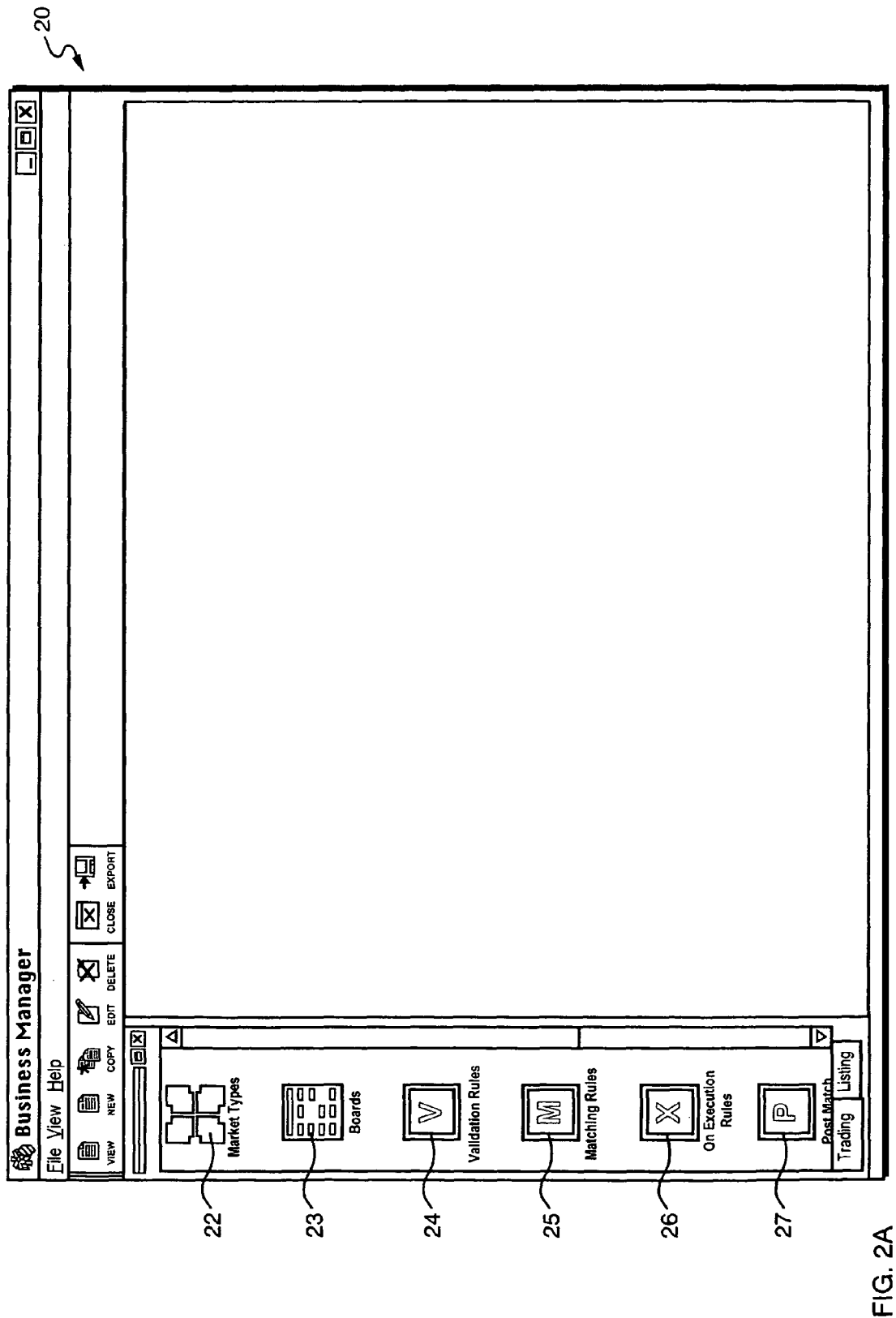
FIGS. 2A-4B are screens that illustrate various operations of the system of FIG. 1 associated with creating and editing business logic rule expressions.
Figure 2B:
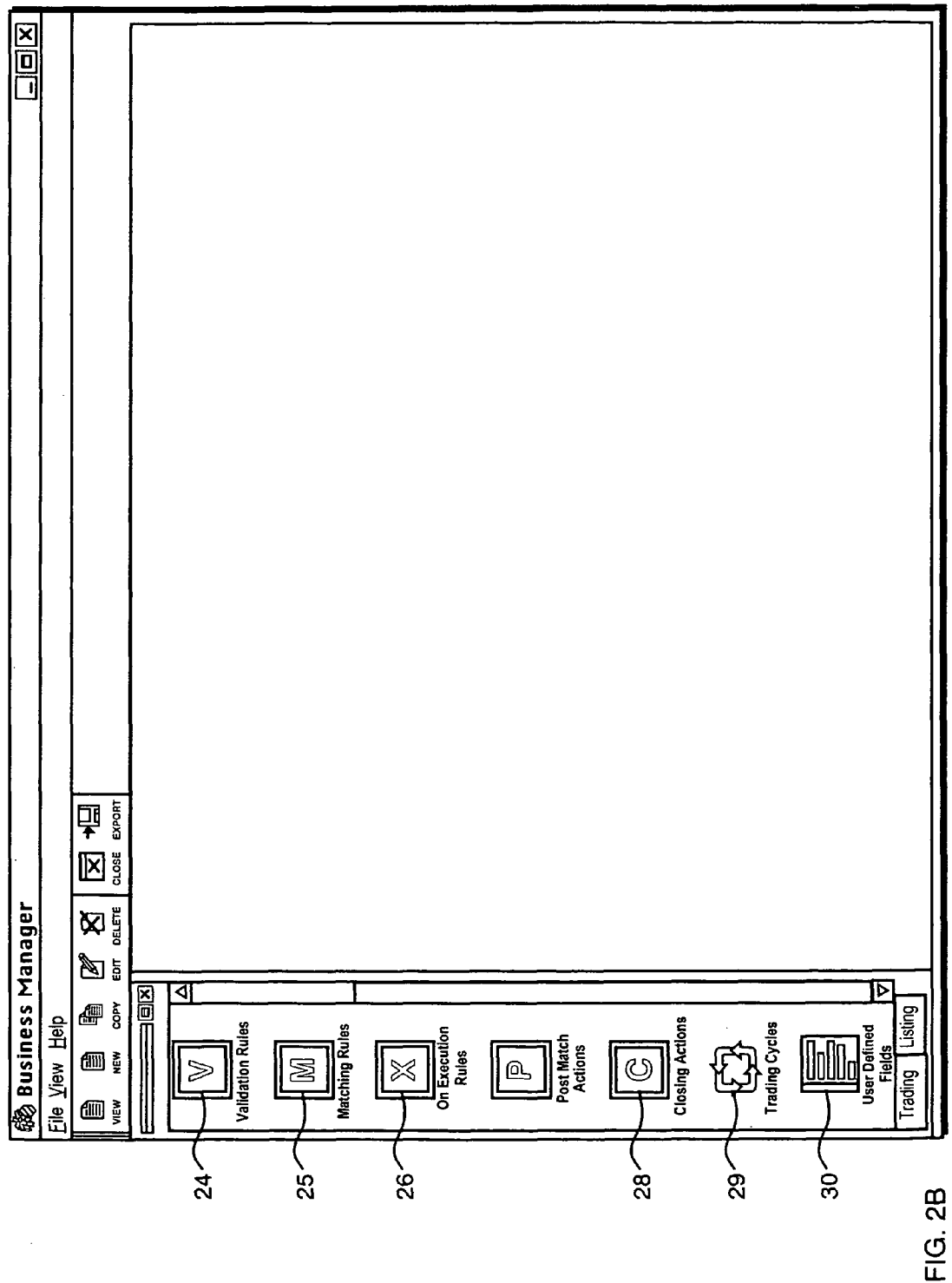

Referring now also to FIGS. 2A and B, the DBLRI 12 provides to a user one or more graphical user interfaces ("GUIs") 20 that allow a user to view, create, and/or edit business logic rules that are utilized to control business operations of interest. In the example of a financial services company, the DBLRI 12 provides a user with GUIs that correspond to respective types of trading rules, for example, validation rules, matching rules, on-execution rules, post-match rules, closing action rules, and so forth. Further, as discussed in more detail below, the user may also view, create and edit user defined parameters or data objects that establish various trading instruments, various market types that define in which market a user may operate, and so forth.

Figure 3:
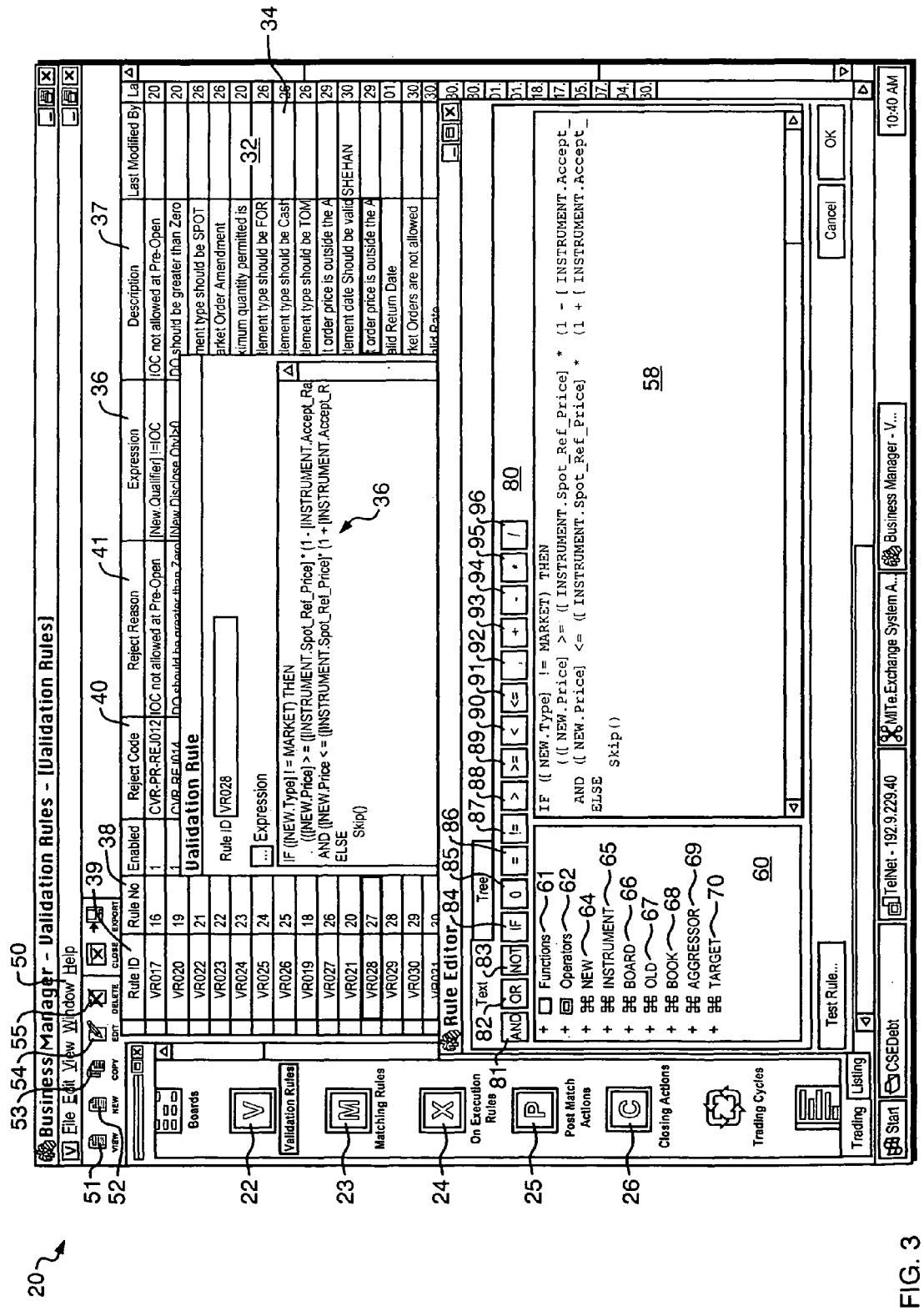

The user selects a rule category of interest by "clicking on" one of the appropriate buttons 22-30. In the example, the user selects validation rules by clicking on button 24. As shown in FIG. 3, the validation rule GUI presents the user with a table 32 of the current validation rules. The user may then click on the table entry 34 for a rule of interest to examine the rule. As shown in the table, the rule includes a functional-language expression 36 of the underlying business logic rule and a brief description 37 of the rule. The rule also includes a unique rule identifier 39, and a rule number 38 that indicates the position of the rule in the table. In addition, the rule may also include a rejection reason 41 that lists what is presented to the user when the rule is invoked, and a rejection code 40 that is used internally by the system to test or track the operations that invoke the rule. The rejection code points to a code verification rule that collects associated data, such as the number of times the rule is invoked, and so forth. The creating of the respective rules will be discussed in more detail below.

In the example, the user elects to edit validation rule VR028 by selecting the rule and clicking on the edit function button 54 in the header 50. The DBLRI rule editor presents to the user, in a sub-window 58, the functional-language expression of rule VR028. Further, the DBLRI rule editor provides a menu 60 with selections for functions 61, operators 62, and associated parameter types 63, i.e., new 64, instrument 65... aggressor 69, target 70, and so forth, that relate to trade validation operations, as defined by industry standards and/or the underlying business operations of the user. The operators, functions and data types are pre-defined during system set up. However, the user may add new parameters, and write new rules or edit existing rules by selectively incorporating various parameters, operators and functions.

The validation rule VR028 includes a defined term or "keyword," namely, "MARKET," as denoted by all capital letters. The keywords, are recognized, or common, terms in the applicable industry, and are either contained in a functional language dictionary 17 (FIG. 1) that is included in the database 16 or dynamically defined by the user, as discussed in more detail below.

The user incorporates the keywords in the expressions 36 for the business rules in much the same way that the terms are used in the corresponding spoken language. In the example, the keyword MARKET is used to define an order type. Thus, the functional language equivalent of stating that the new order must not be a market order is NEW.Type!=MARKET, where NEW.Type is a parameter that is selected from the NEW parameter type entry 64 in menu 60, the logical operation != is selected using button 87 in the header 80, and the term MARKET is selected from the dictionary 17. The definition of MARKET incorporates the criteria, or selected field information, associated with market orders, and thus, represents one or more conditions that a given parameter must meet to be defined as a market order. The keywords are essentially data objects that satisfy specified criteria. Similarly, the functions and operators are defined within the system, such that the system operatively performs the appropriate steps with the associated parameters, to control the business operations in accordance with the business logic rules.

To produce an expression for a new or an edited business logic rule, the user incorporates particular functions, operations, parameters, logical operators, and key words that correspond to the underlying business operation. As shown in the drawing, the user writes and/or edits the expression for a business logic rule using a functional language that has a syntax that is relatively close to a spoken language. As discussed below, the functional language specifies the rule essentially as an executable routine.

When a new rule is added the user also specifies when the new rule is invoked relative to the other rules in a particular category, i.e., within the validation rule category, by assigning the rule a position in the table 32 of validation rules. The system thus allows the user to create, update, and essentially re-design rule-based operations that perform in a manner that is analogous to how the business itself operates.

When the editing of the rule is completed, the DBLRI 12 evaluates the expression and produces a corresponding executable routine that can be called by the application software. The DBLRI generally produces a parse tree when the corresponding business logic rule controls day-to-day, or "on-line," actions. The DBLRI produces the DLL when the routine is one that is utilized "off-line," such as a rule that manipulates accumulated data. An example of a rule that is translated into a DLL is a rule that sets discounted billing rates based on minutes used during a given billing cycle. The DLLs may be written in, for example, C++, and compiled in a conventional manner.

Figure 4A:
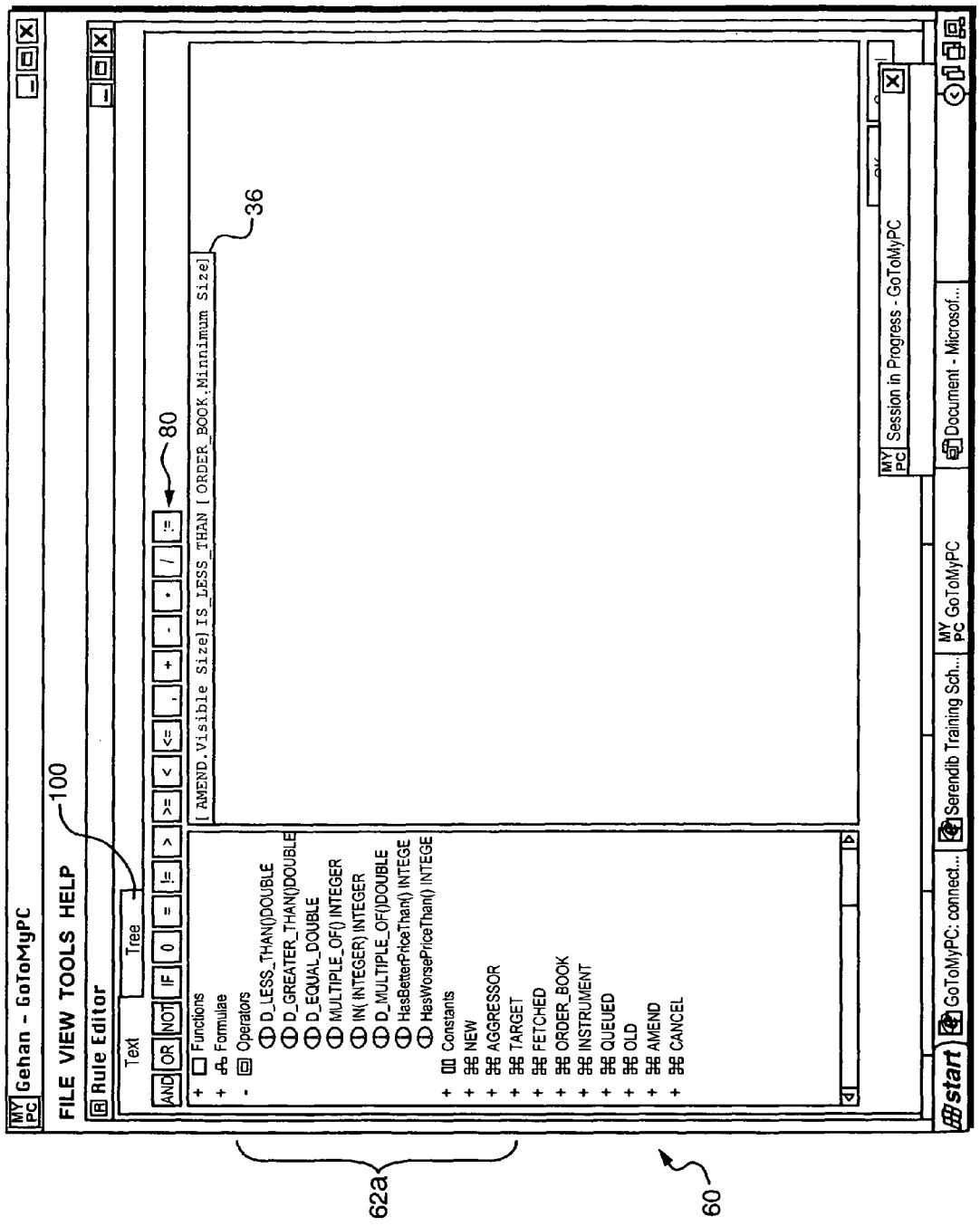
Figure 4B:
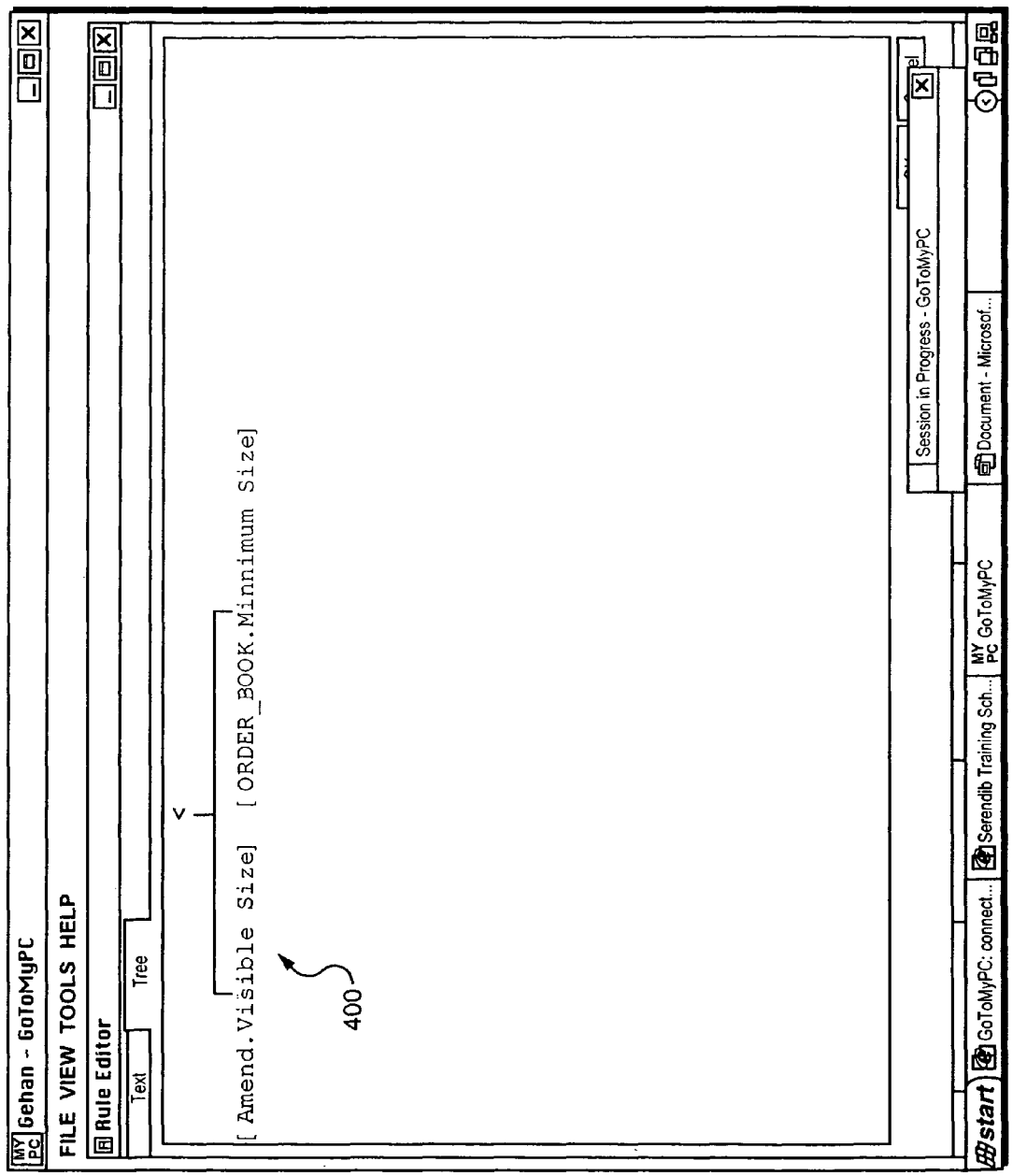

For the convenience of the user, the DBLRI generates a parse tree for each expression. Thereafter, the parse tree may be populated and used directly by the application program or the parse tree may be used to produce an associated DLL. As depicted in FIGS. 4A-B, the user may view the parse tree 400 that corresponds to a given rule by selecting the parse tree page using the button 100. The user may then determine from the parse tree diagram if the new rule operates as the user intended. As shown, the user may choose to include in the expression 36 the functional language "IS LESS THAN"

which is selected from the list 62A of operators in the menu 60. Alternatively, the user may select the "<" operator from the header 80. Either way, the system produces the appropriate parse tree 400.

The DBLRI generates the parse trees using a highly recursive process. The process evaluates a given functional language expression to produce various sub-trees that contain, respectively, one or more branches or decision points, and then attaches the sub-trees to respective nodes to produce the main tree.

The DBLRI produces a sub-tree based on tokens that represent data types in the expression. We discuss first how the tokens are assigned, and then how the DBLRI uses the tokens to produce the sub-trees.

Figure 5A:
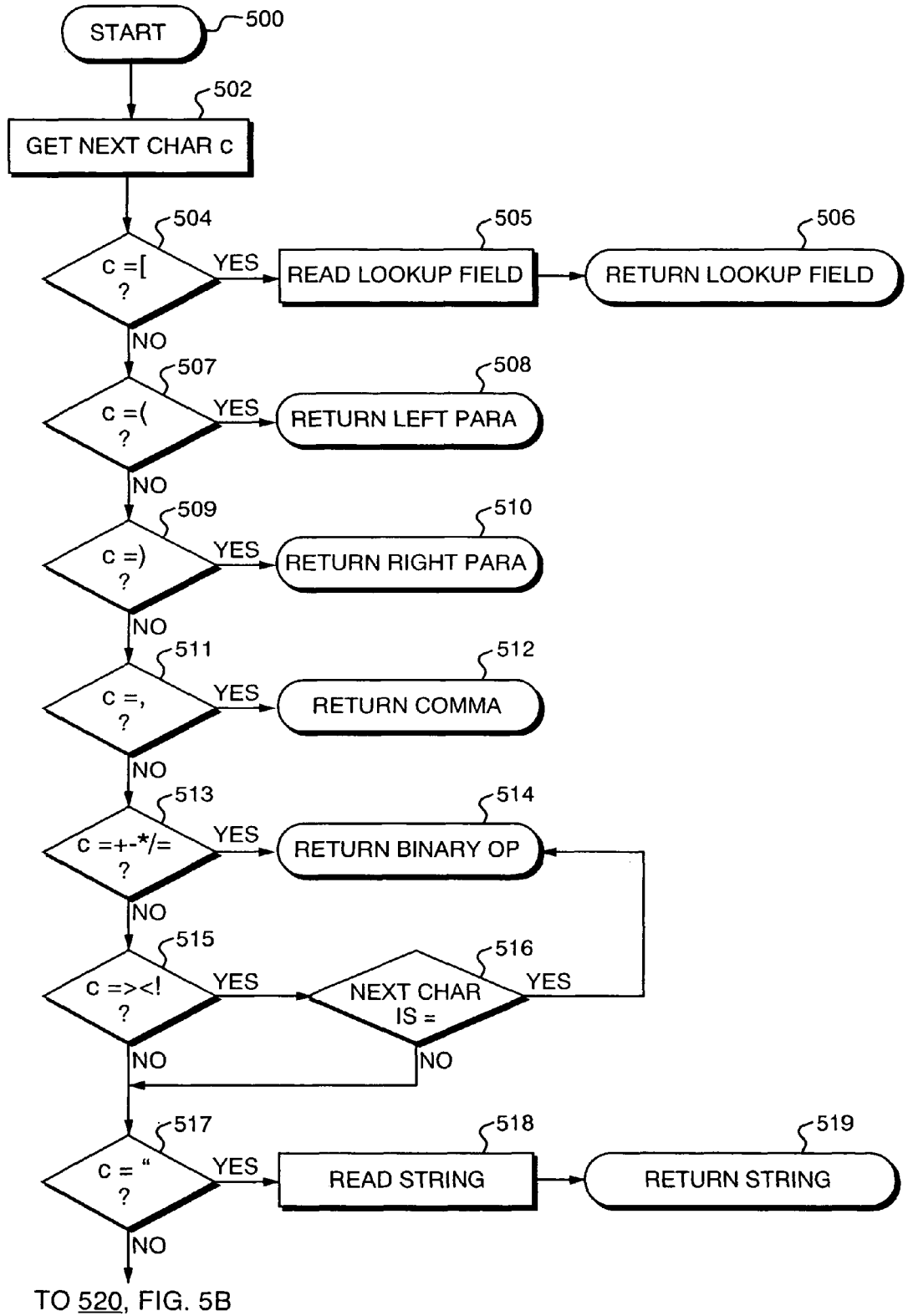
FIGS. 5A-16 are flow charts of various operations of the system associated with parsing the business logic rule expressions.
Figure 5B:
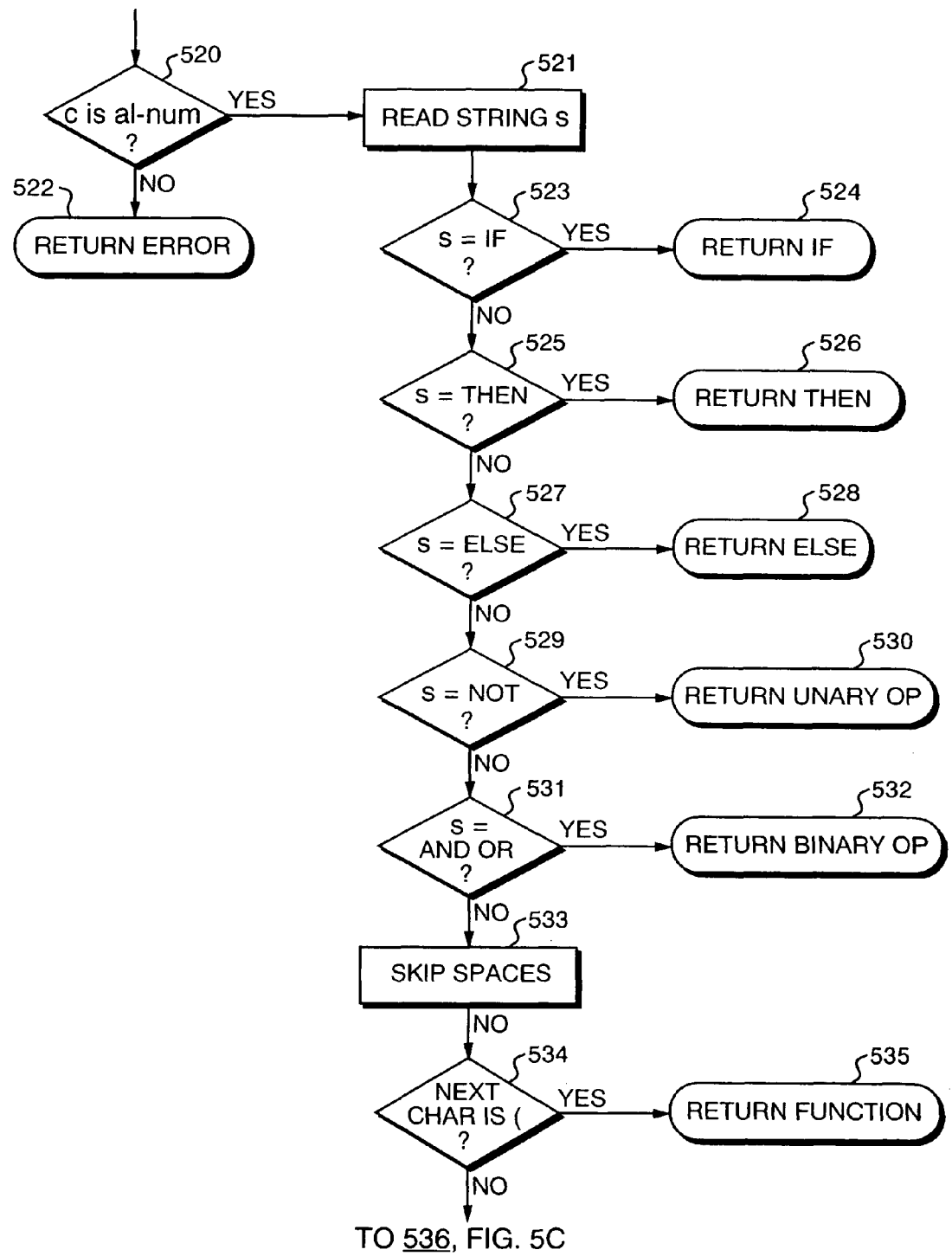
Figure 5C:
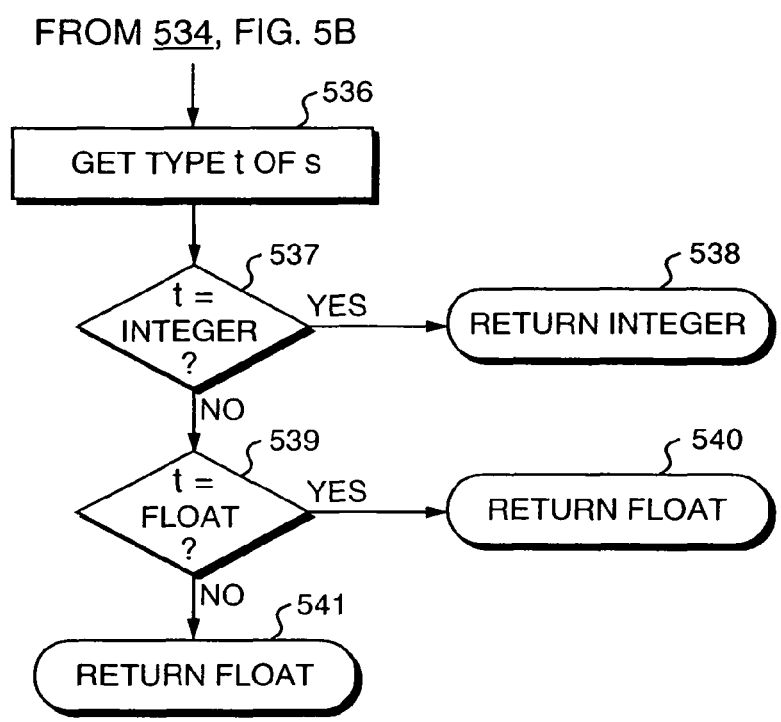
Figure 6A:
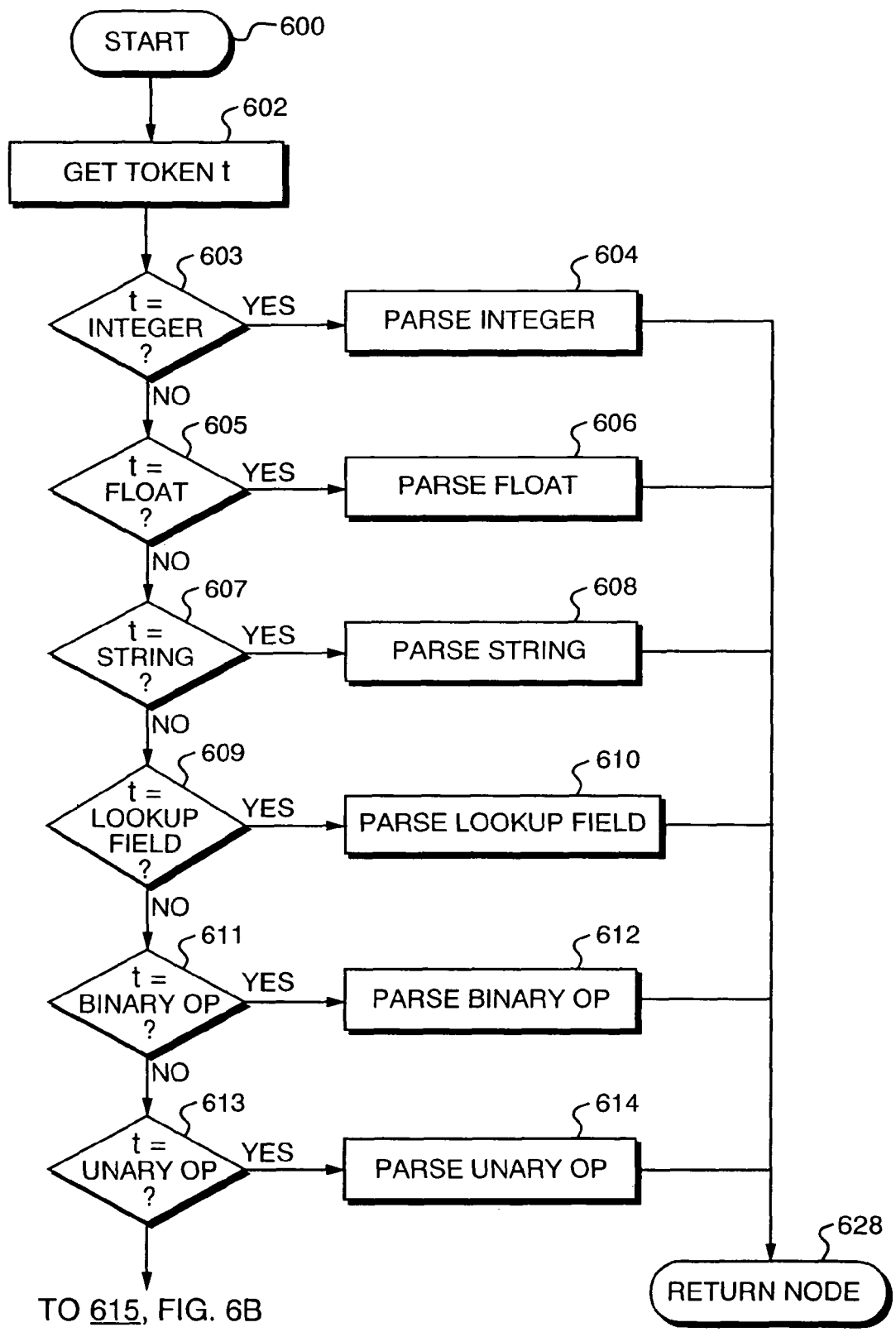
Figure 6B:
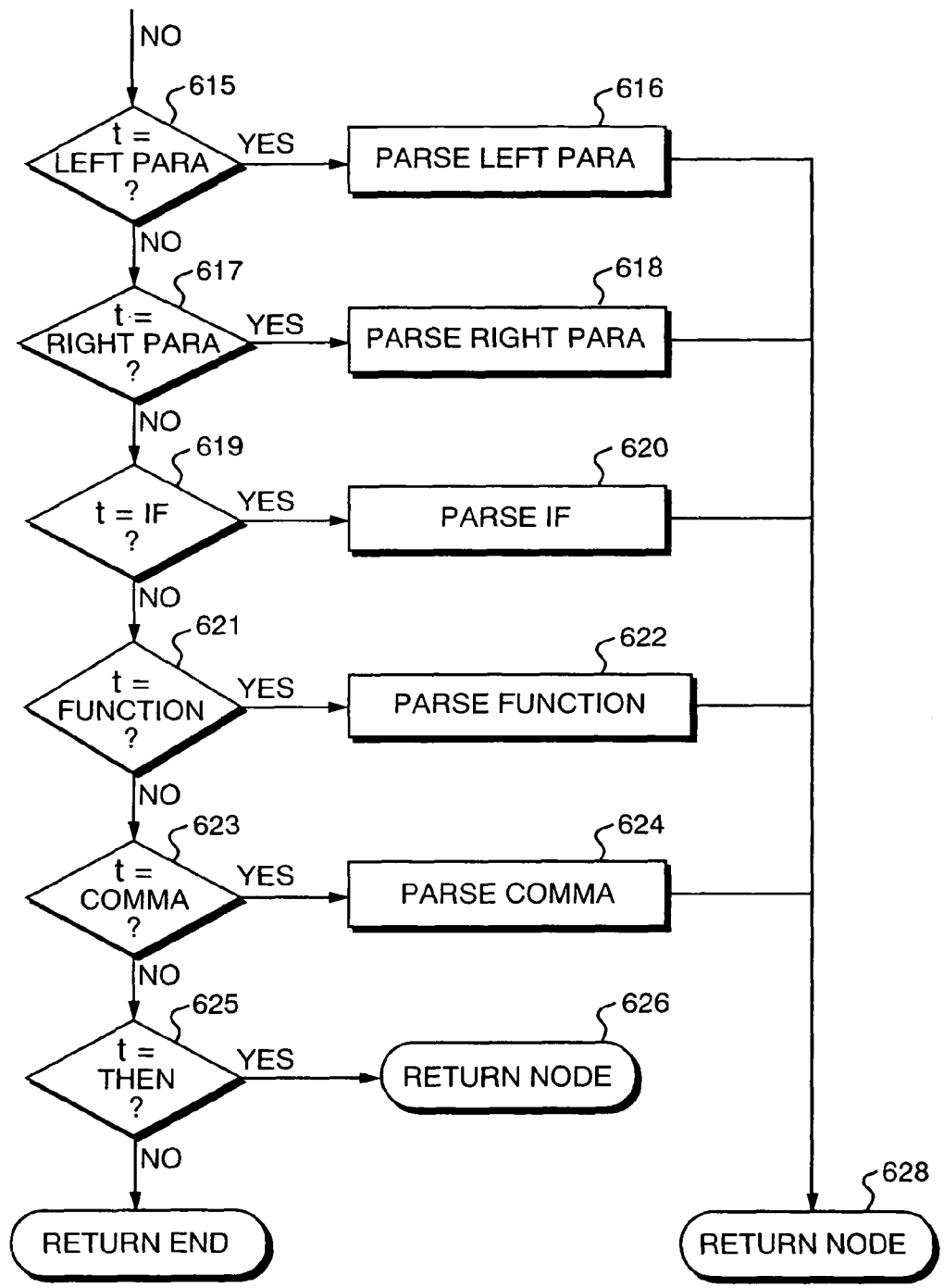

Referring now to FIGS. 5A-C, the DBLRI starts (step 500) the process of assigning a token by looking at a next character in the expression (step 502). The process iteratively determines what the character is, and thereafter assigns an appropriate token (steps 504-540). More specifically, the token-assigning process first determines if the character is a left bracket (step 504). A left bracket indicates that the next set of characters, that is, the characters between the left bracket and an associated right bracket, represent a look-up field that corresponds to a field or sub-field in the database 16 (FIG. 1). Accordingly, if the character is a left bracket, the process reads the associated lookup field name from the expression (step 505) and assigns, or returns, a corresponding lookup field token (step 506). When the process restarts with the next character in the expression, the process evaluates the character that succeeds the right bracket, that is, the character that follows the lookup field name.

If the character under evaluation is not a left bracket, the token-assigning process determines if the character is a left parenthesis (step 507). If so, the process returns a left parenthesis token (step 508). Otherwise, the process continues and next determines if the character is a right parenthesis. If the character is a right parenthesis, the process returns the appropriate token (steps 509-510). Otherwise, the process determines if the character is a comma and, if so, returns the corresponding token (steps 511-512).

If the character is not a bracket, parenthesis or a comma, the process determines if the character is a binary operator, that is, a plus sign, a minus sign, a multiplication sign, a division sign or an equal sign (step 513). If so, the process returns a binary operation token (step 514).

If the character under evaluation is not one of the listed binary operations, the process determines if the character is one of a greater than, a less than or an exclamation point symbol (step 515). If so, the process determines if a next character is an equal sign, and the two characters together thus represent a binary operation (step 516), in which case the process returns to step 514 and produces a binary operation token. Otherwise, the process continues, to determine if the character following one of the greater than, less than or exclamation point symbols is instead a quotation mark (step 517) or an alphanumeric (step 520), which indicate the start of respective strings. If not, the process determines that the original character cannot be identified, and the process returns an error message (step 522). The process also performs the steps 517-522 if the character, in step 515, has not yet been identified.

If the character under evaluation indicates the start of a string, that is, if the character is a quotation mark or an alphanumeric, the process reads the string (steps 518, 521) and, as appropriate, returns a corresponding string token (steps 519, 541). If, however, the string is a statement, i.e., "IF", "THEN", or "ELSE", the process returns an appropriate statement token (steps 523-528). If the string instead represents an operation, i.e., "NOT" or "AND OR," the process returns the appropriate unitary or binary operator token (steps 529-532). Otherwise, the process determines, after skipping spaces (step 533), if a next character in the expression is a left parenthesis (step 534). If so, the process identifies the string under evaluation as a function, and the process returns a corresponding function token (step 535).

If the string following an alphanumeric has not been identified as a statement, operator or function, the process, in step 536, consults a table (not shown) to determine the string type. If the string represents an integer or a floating point value, the processor returns the appropriate token for the integer or floating point value (steps 537-540). Otherwise, the process returns the string token (step 146) as discussed above.

Once the tokens are assigned to the expression, a token binding process associates the tokens that relate to the same operations or functions. The token binding process thus associates the tokens representing operands with the operation token. Further, the process binds the tokens representing particular values with the appropriate function token, and so forth.

The token binding process starts at the left-hand side of the rule expression and determines the position of a first function or operation token. The process then associates with the function or operation token the tokens that represent the respective operands or values. For example, the process binds to a binary operator token the tokens that represent the two integers, floating point values, lookup table values, and/or functions that represent the associated operands. As necessary, the token binding process performs the same steps for operations and functions that are performed to produce the various operands, and so forth. Each grouping of tokens represents a sub-tree.

The system next produces sub-trees for the various operations, functions and so forth, by parsing the sub-expressions that are represented by various groupings of tokens. Referring now to FIGS. 6-16, the sub-tree parsing process starts (step 600) with a given token and performs a series of checks to determine what data type the token represents.

In step 603 the process determines if the given token is an integer token. If so, the sub-tree procedure parses the integer, as discussed below with reference to FIG. 7 to produce an integer node, and the integer node is returned to the sub-tree process (step 628).

If the token is not an integer token, the sub-tree procedure checks if the token is a floating point value token, a string token and so forth (steps 605-627). When the token type is identified, the process, with one exception, performs the appropriate parsing sub-process, and returns the associated node. The one exception relates to a THEN token, in which case the sub-tree process returns a THEN node directly to the sub-tree process (step 626).

Figure 7:
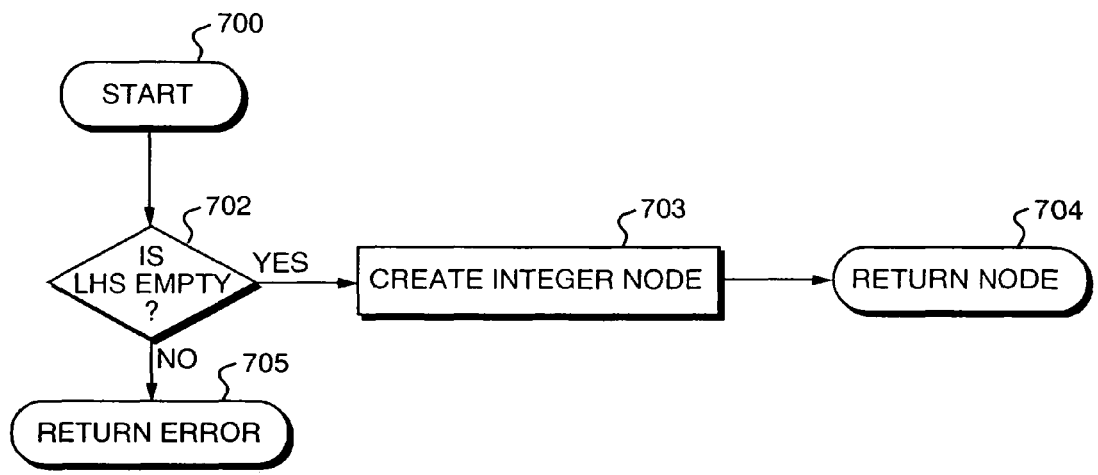
Figure 8:
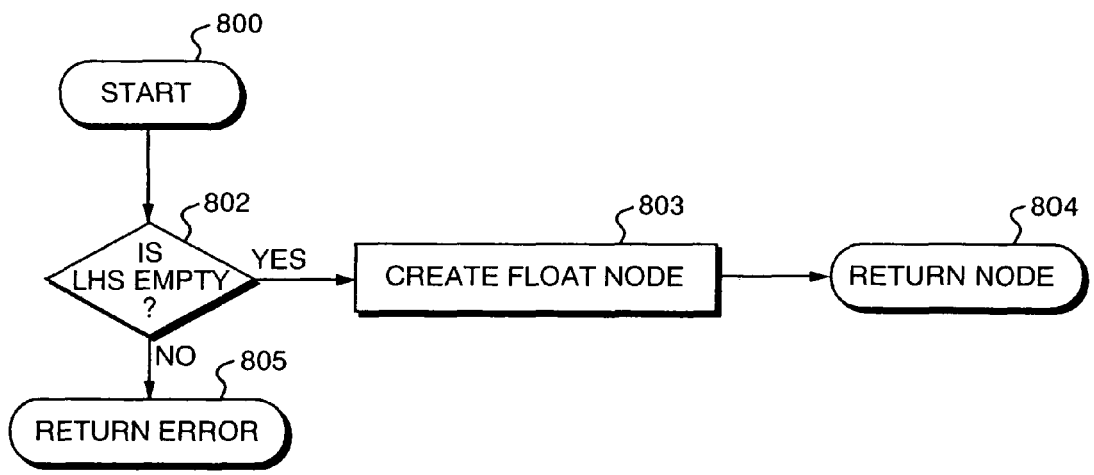
Figure 9:
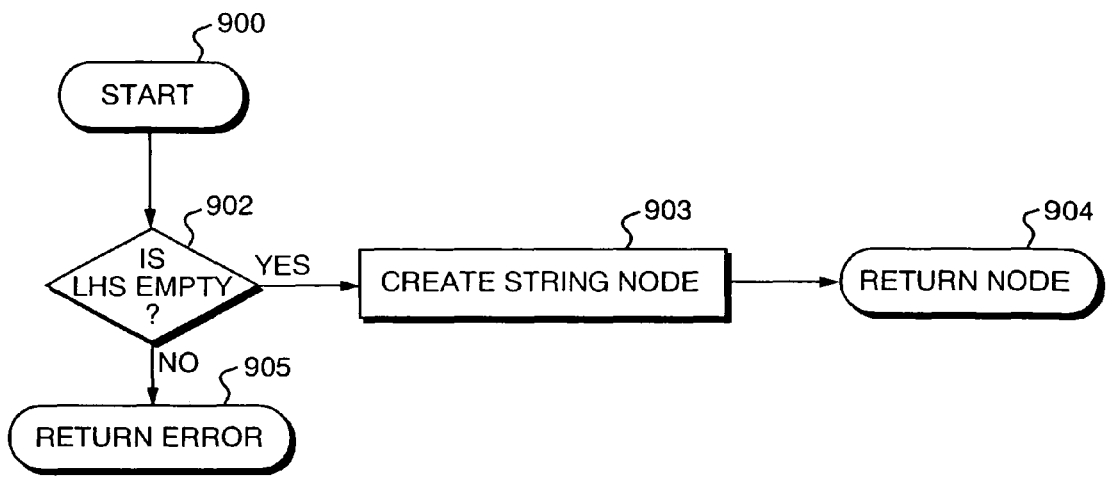

Referring now to FIGS. 7, 8 and 9, when the token represents a data type that is a parameter value, such as an integer, a floating point numeral, or a string, the system starts a sub-process to parse the data type (steps 700, 800, 900) by checking that the left hand side, that is, the path in the tree that leads from the integer is empty (steps 702, 802, 902).

If not, that is, if the integer in not a leaf in the associated branch of the sub-tree, the process returns an error message (steps 705, 805, 905). Otherwise, the system creates the appropriate integer, floating point or string node (steps 703, 803, 903), and the node is returned to the sub-tree process (steps 704, 804, 904).

Figure 10:
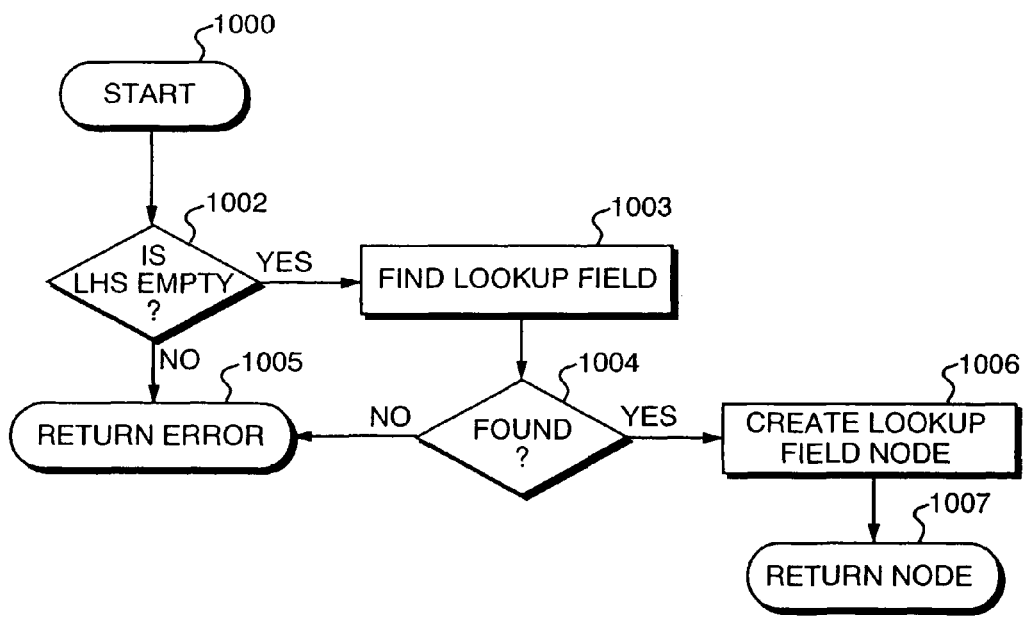

Referring now to FIG. 10, when the process starts a sub-process that parses a lookup field data type (step 1000), the sub-process checks that the left-hand side or the path that leads from the lookup field is empty (step 1002). If not, the sub-process returns an error message (step 1005). If the left hand side is empty, the sub-process uses the pointers or other information bound to the lookup field token and checks that the associated lookup field can be found (step 1004) in, for example, the data base 16 (FIG. 1). If the lookup field can be found, the sub-process creates an associated lookup field node and returns the node to the sub-tree process (steps 1006, 1007). Otherwise, the sub-process returns an error message (step 1005).

Figure 11:
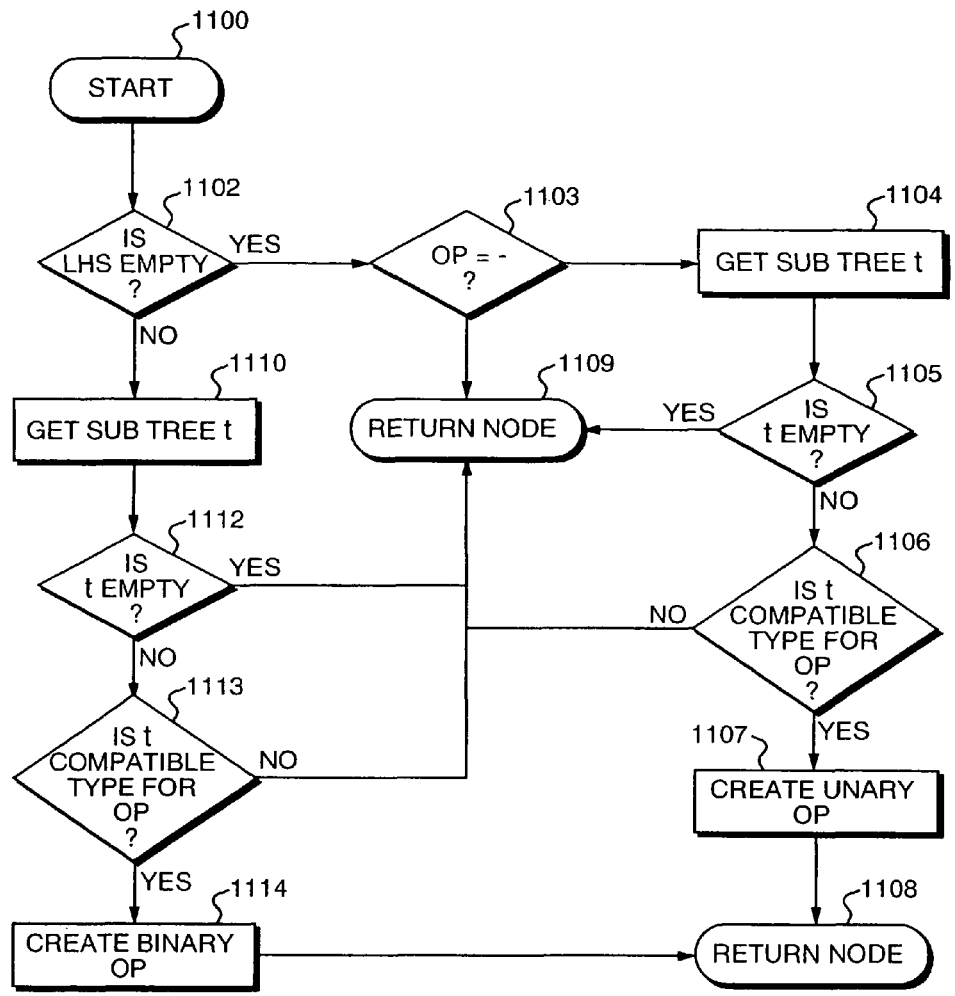

Referring now to FIG. 11, a binary operator parsing sub-process starts (step 1100) by checking if the left-hand side, or path, is empty (step 1102). If so, the process next checks if the sub-expression is a negative operation, i.e., if the operator produces the negative of the given value. If so, the process gets the associated sub-tree, that is, the sub-tree that represents the associated operand (step 1104). The process then checks whether the sub-tree is empty (step 1105), and if so, the process returns an error (step 1109). Otherwise, the process determines if the sub-tree type is compatible with the negative operator (step 1106), and if so, the process creates an associated unary operation node (steps 1107, 1108).

If the left-hand side of the binary operator is not empty, the processor gets the appropriate sub-tree and determines whether to send back an error or create and return a binary operator node (steps 1110-1114).

Figure 12:
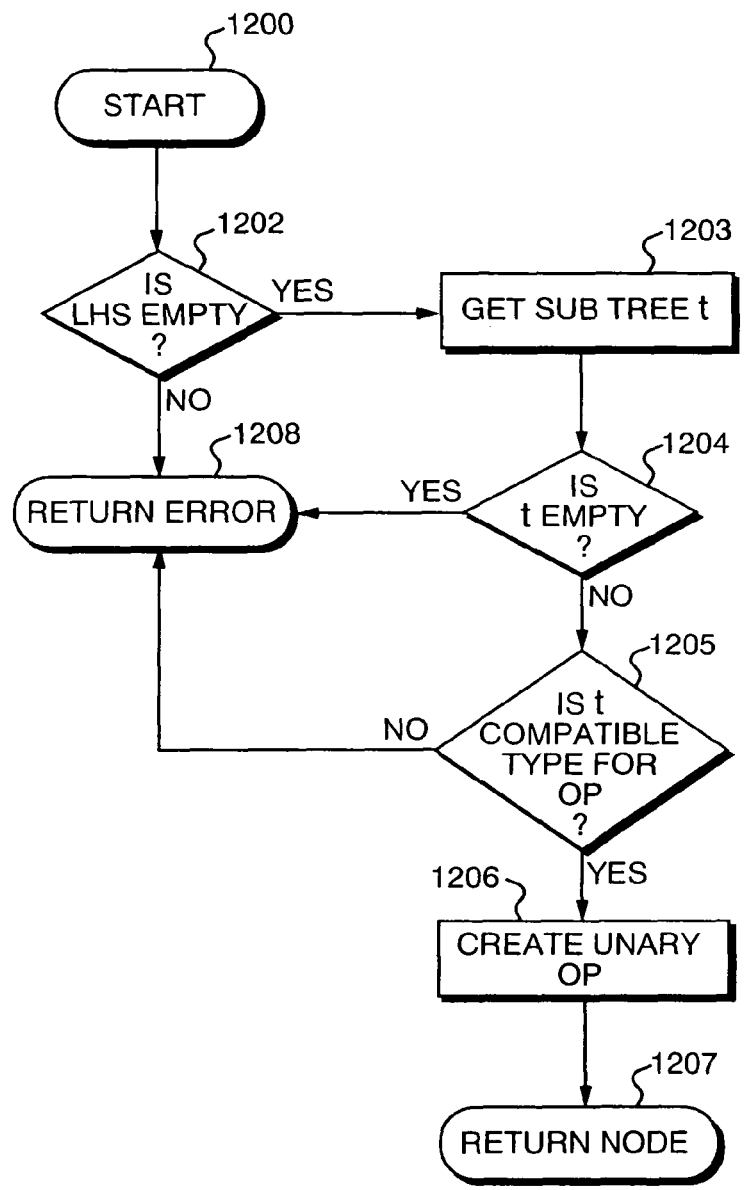

FIG. 12 is a flow chart of the sub-process for parsing a unary operator. The procedure begins in step 1200 and checks if the left-hand side or path is empty. If the left-hand is empty, the sub-process returns an error (step 1208). Otherwise, the sub-process obtains an associated sub-tree, that is, the sub-tree that represents or produces the value on which the unary operator acts (step 1203). The process then tests the sub-tree (step 1204) to determine if the sub-tree is empty. If the sub-tree to is empty, the sub-process returns an error (step 1208). Otherwise, the sub-process determines, in step 1205, if sub-tree t is compatible with the type of unary operation to be performed. If the sub-tree is not compatible, the procedure returns an error (step 1208). Otherwise, the sub-process creates a unary operator node and returns the node to the sub-tree process (steps 1206, 1207).

Figure 13:
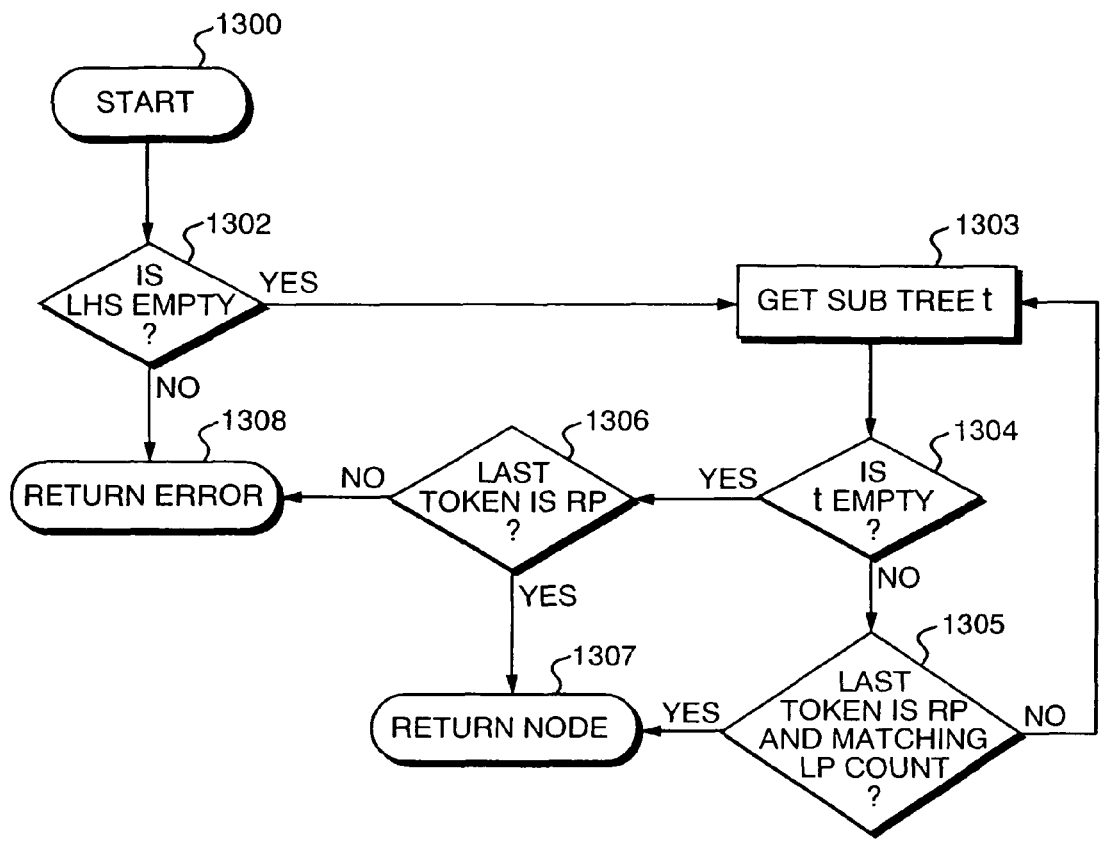

FIG. 13 is a flow chart of the sub-process for parsing a left parenthesis. The sub-process begins in step 1302 and determines if the left-hand side or path is empty. If the left-hand side is empty, the sub-process returns an error (step 1308). Otherwise, the sub-process obtains the associated sub-tree t, which represents what occurs next in the under-lying expression (step 1303). The sub-process then checks to determine if the sub-tree is empty (step 1304). If the sub-tree t is empty, the sub-process determines if the last associated token is a right parenthesis (step 1306). If not the sub-process returns an error (step 1308). Otherwise, the sub-process returns a node (step 1307).

If the sub-process determines that the sub-tree t is not empty, the sub-process determines if the last token was a right parenthesis and also if the number of right and left parentheses match (step 1305). If so, the sub-process returns a node (step 1307). Otherwise, wise, the procedure branches back to step 1303 and obtains a next sub-tree t. The sub-process then repeats steps 1304-1308.

Figure 14:
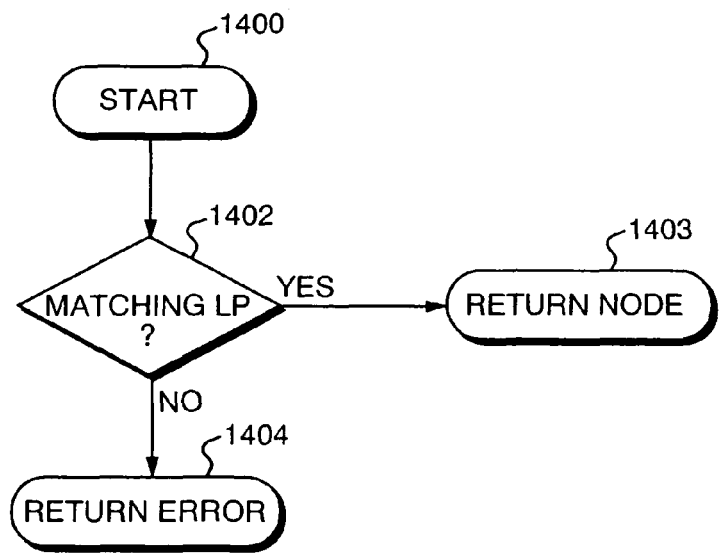

FIG. 14 is a flow chart of the steps involved in parsing a right parenthesis. The sub-process begins in step 1400 and determines if there is a matching left parenthesis (step 1402). If there is a matching left parenthesis, the sub-process returns a node (step 1403). Otherwise, the sub-process returns an error (step 1404)

Figure 15A:
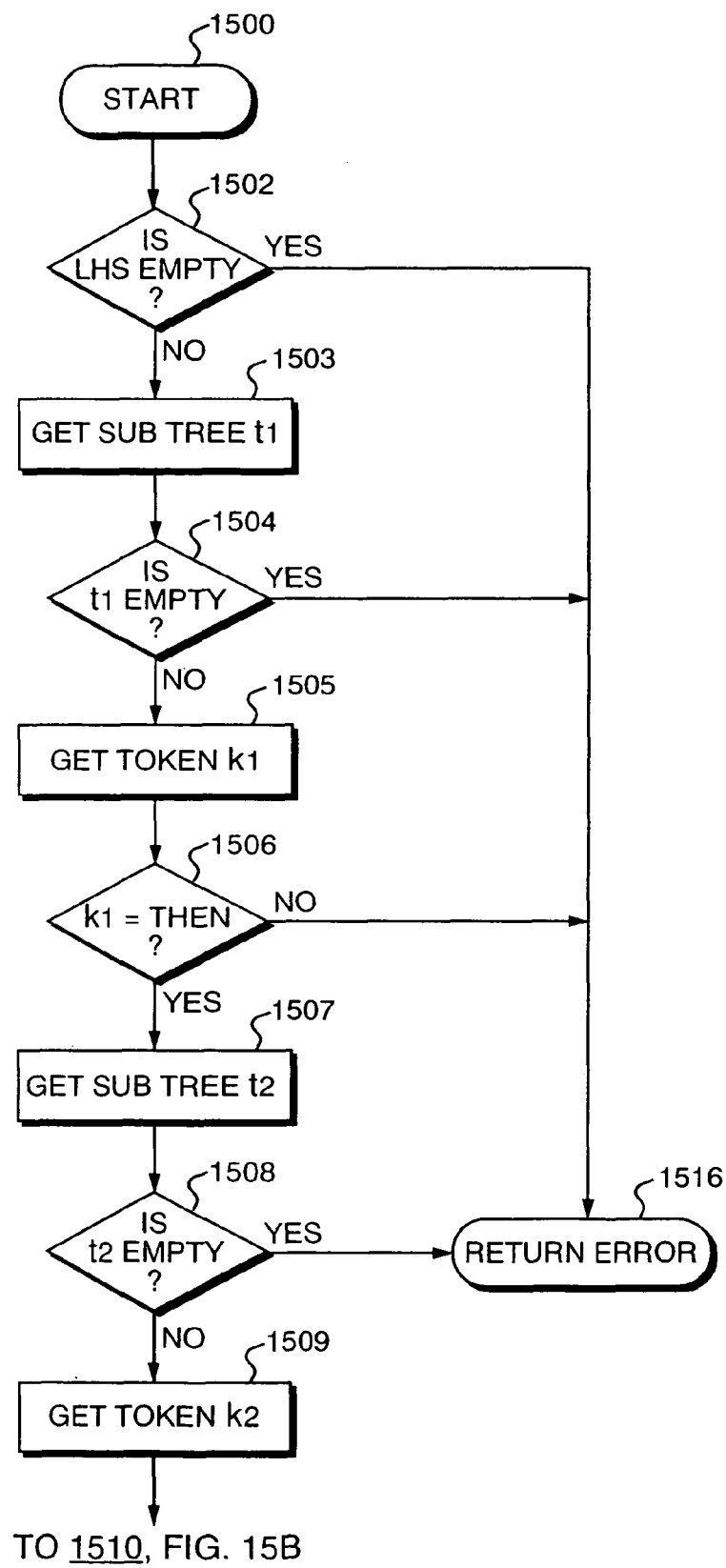
Figure 15B:
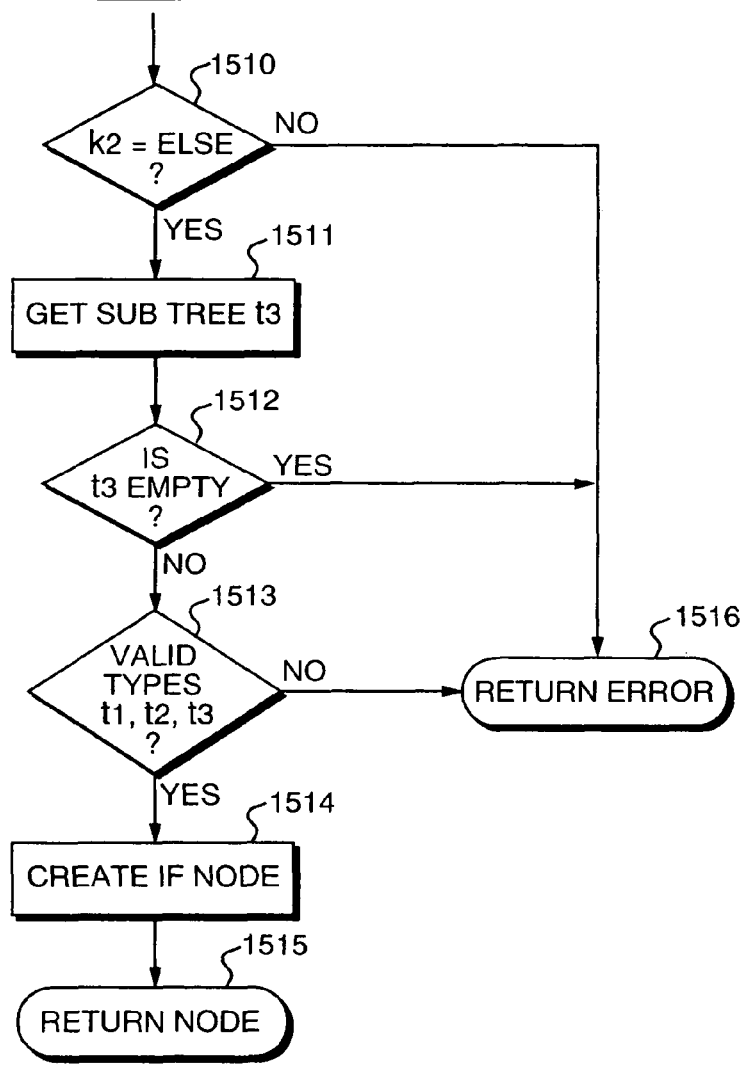

Referring now to FIGS. 15A-B, a parsing sub-process for an IF statement starts at step 1500 and determines, at step 1502, if the left-hand side or path is empty. If so, the sub-process returns an error (step 516). If the left-hand side is not empty, the sub-process obtains a first associated sub-tree (step 1503). The sub-process next checks if the first sub-tree is empty (step 1504). If so, the sub-process returns an error (step 516). Otherwise, the sub-process attaches the sub-tree and obtains a next associated token, which should be a THEN token (steps 1505 and 1506). If the associated token is not a THEN token, the sub-process returns an error (step 1516). Otherwise, the sub-process obtains a next associated sub-tree (step 1507).

The sub-process determines if the next sub-tree is empty, and if so, returns an error (step 1508, 1516). If the sub-tree is not empty, the sub-process attaches the sub-tree and obtains a next associated token. The process determines if this next token is an ELSE token (steps 1509, 1510). If the token is not an ELSE token, the sub-process returns an error (step 1516). Otherwise, the sub-process gets a next associated sub-tree and the process determines if the sub-tree is empty (steps 1511, 1512). If the sub-tree is empty, the sub-process returns an error (step 1516). Otherwise, the sub-process attaches the sub-tree, and the process then determines if the attached first, second and third sub-trees all represent valid statements. If so, the sub-process creates an IF node and returns the node to the parse tree process (steps 1513-1515). If the sub-trees do not represent valid statements, the sub-process returns an error (step 1516).

Figure 16A:
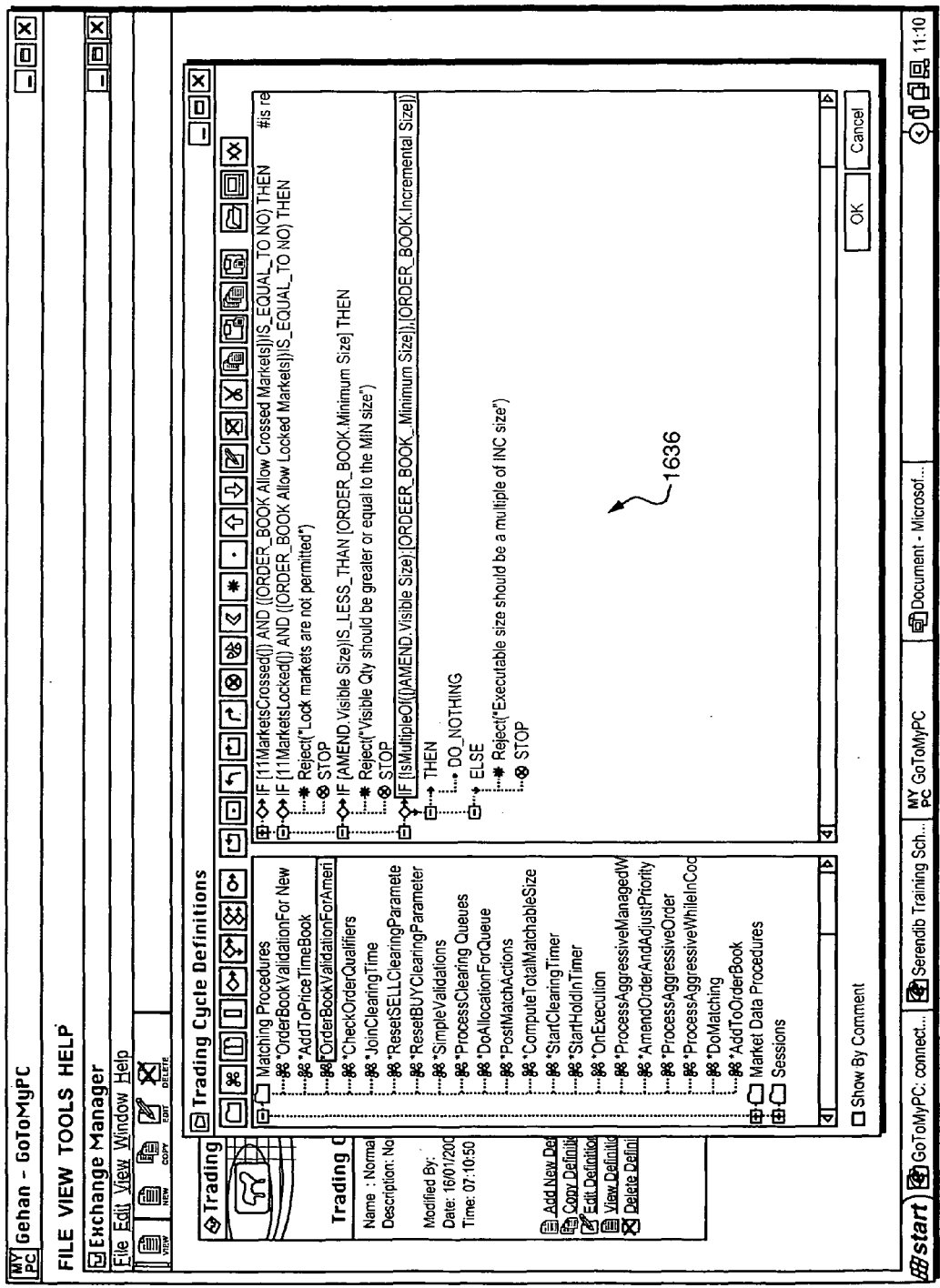
Figure 16B:
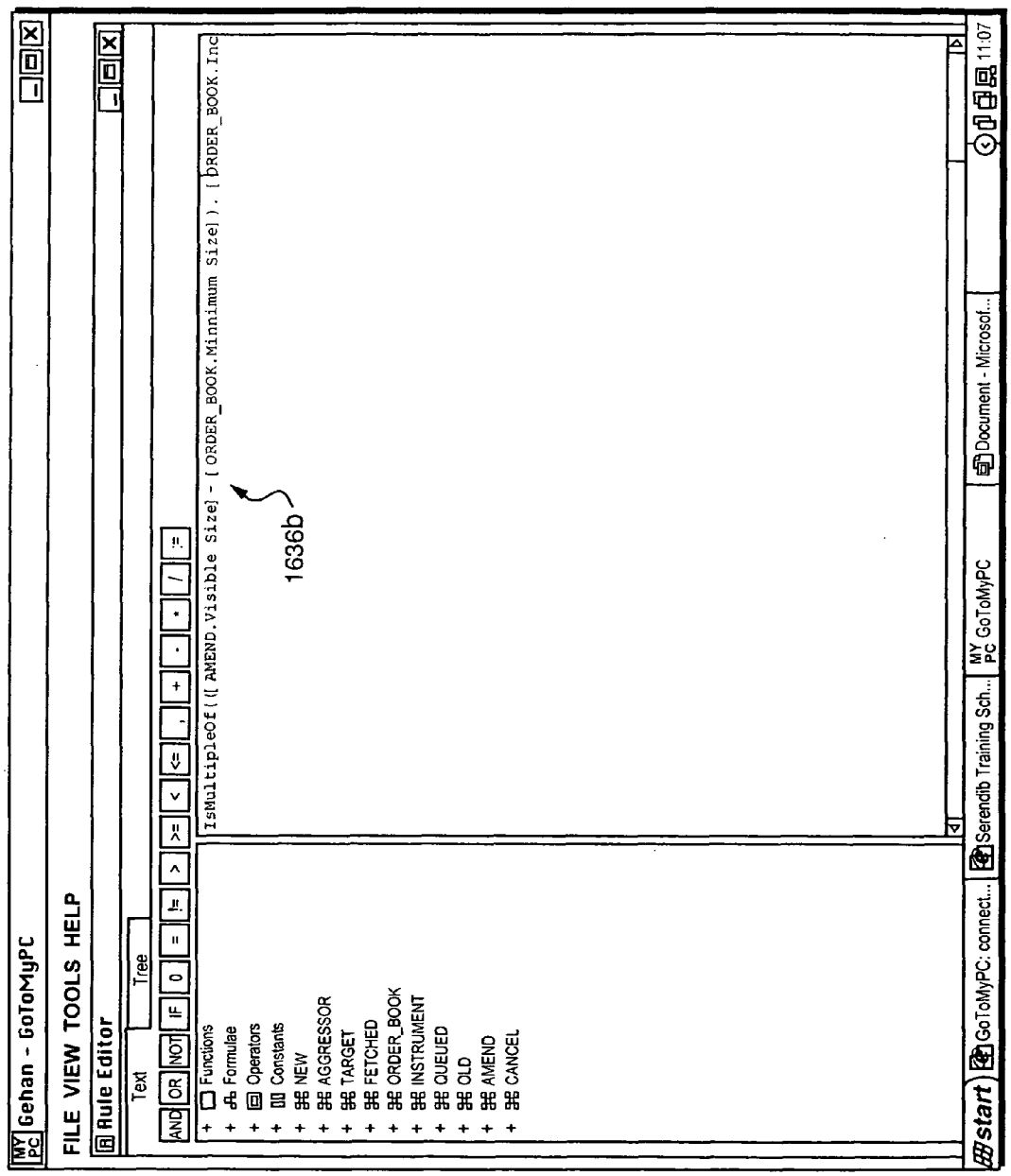
Figure 16C:
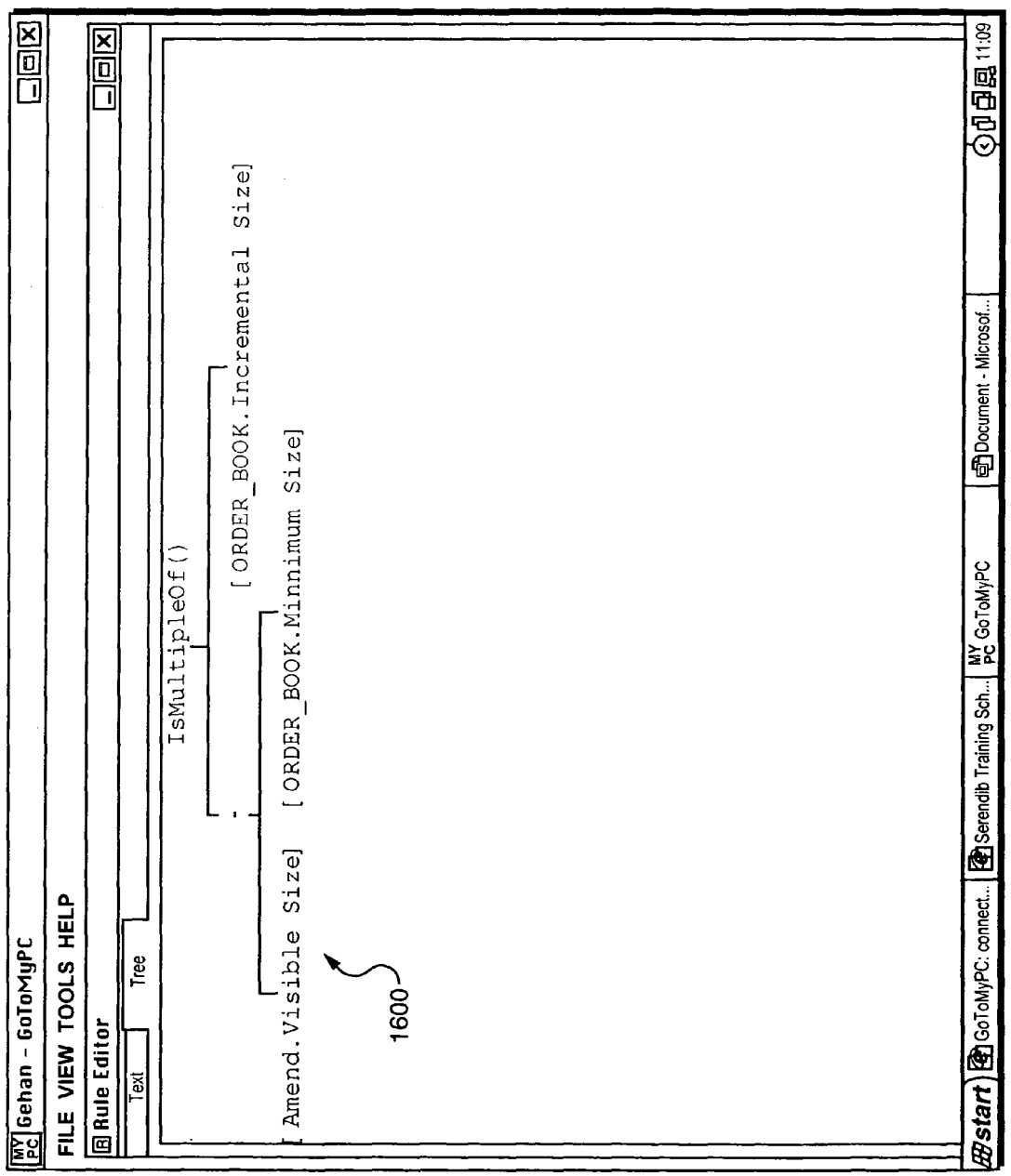

A token representing a function is associated with a corresponding pre-coded routine. The function token is also bound to tokens representing the various values required by the function. Accordingly, the parsing process for a function token determines if the various associated values are compatible with the function type. If so, the parsing of the function is complete and a parse tree is produced. FIGS. 16 A-C depicts a parse tree 1600 for the function 1636B listed in FIG. 16B. As shown in FIG. 16A, the function is part of an expression 1630 that defines a trading cycle. Otherwise, an error is retained.

The DBLRI also incorporates other changes to the business operations into the application, without requiring the re-writing or re-compiling of the application software. For example, the DBLRI utilizes tables in the database 16 that, under the control of the dynamic parameter manager 19, allow the user to add, edit, group and re-group parameters, and thus handle underlying business operations that are expanded to include, for example, the trading of a new type of security. Through the revised and/or expanded database tables, the DBLRI incorporates the new security in various existing business logic rules by essentially enlarging the scope of the parameters that are included in the rules. Further, the DBLR1 incorporates, as necessary, new and/or updated rules that are associated with the new type of security in the manner discussed above.

C. The Dynamic Parameter Manager

Figure 17:
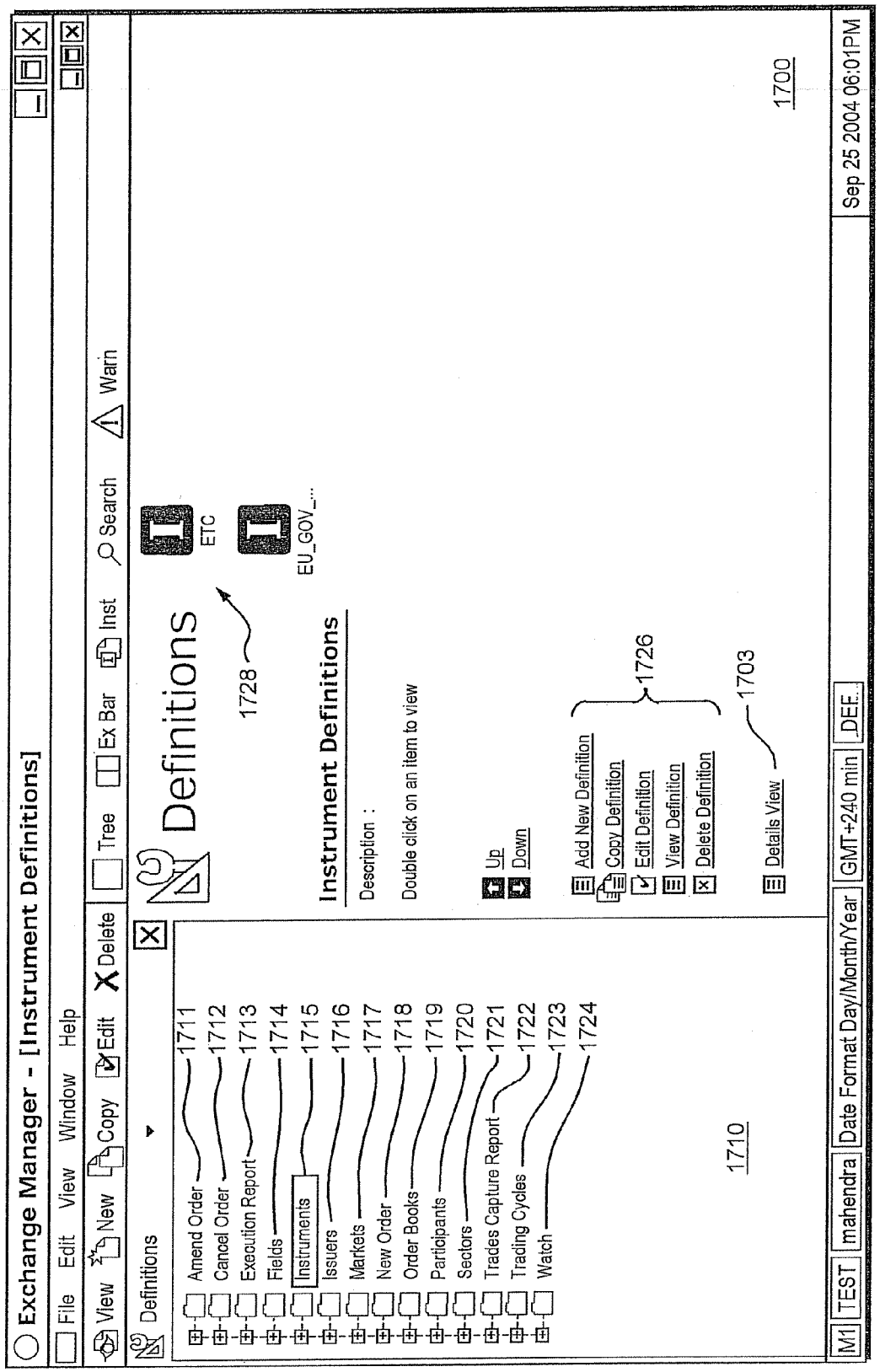
Figure 18:
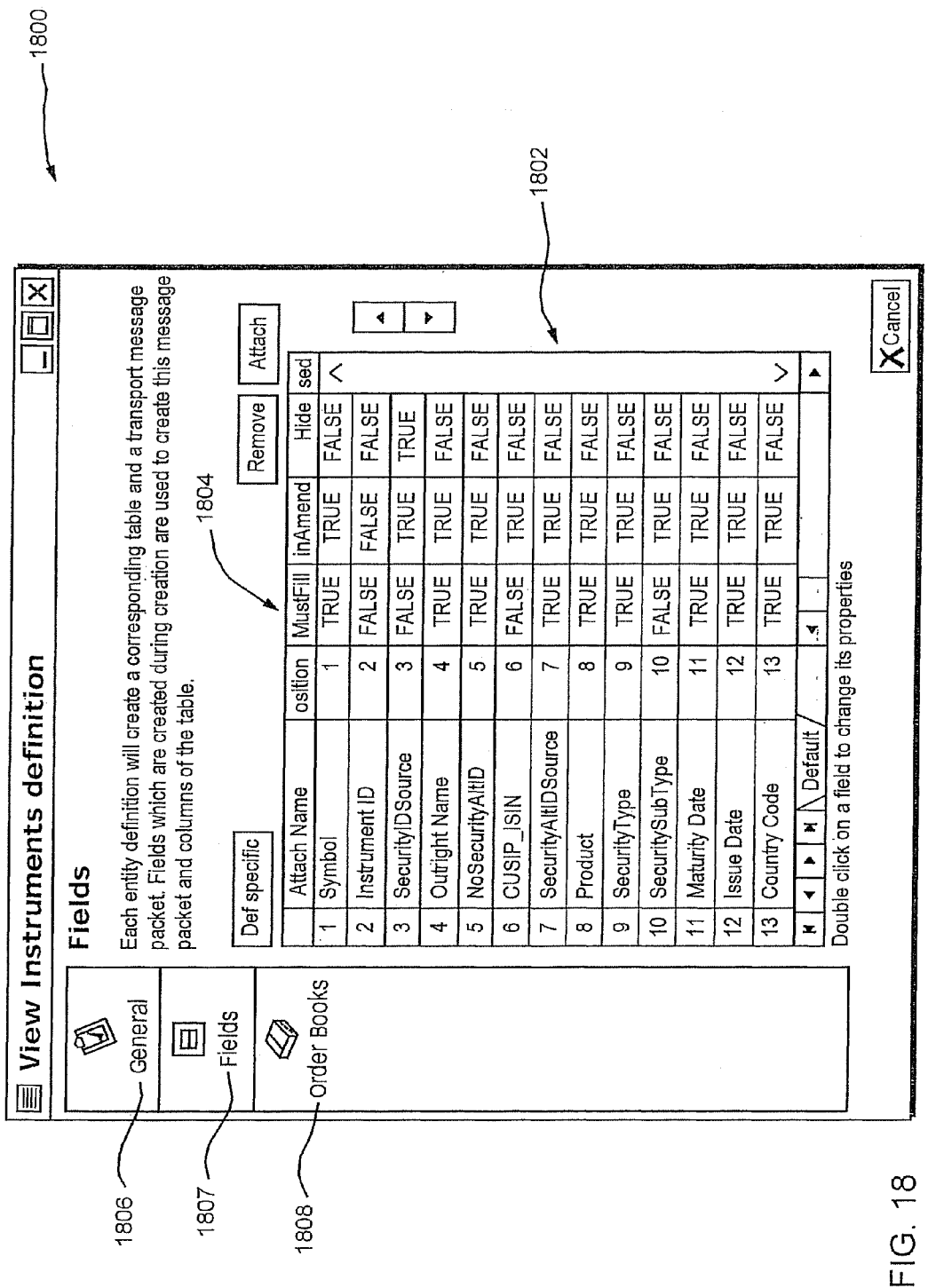

Referring now to FIG. 17, operating in definition mode the dynamic parameter manager 19 provides to a user a GUI 1700 which includes in a menu 1710 entries for base entities 1711-1722, trading cycles 1723 and a (market) watch 1724. The base entities are defined at system start-up and essentially correspond to fundamental elements of and/or operations performed as part of the underlying business plan. In the example of a trading business, the base entities represent the fundamental elements of and/or types of operations performed by the trading business, namely, the taking/validating of new orders, amending orders, maintaining order books, and so forth, as well as the instruments traded, markets in which trades occur, and so forth. The respective base entities have associated with them sets of parameters that are required for the system to utilize the rules that are associated with the operations and/or elements. For example, the New Order base entity is associated with a set of required parameters that include Instrument ID, Broker ID, Trader ID, and so forth. The Instrument base entity is associated with a set of parameters that include Trading Symbol, Instrument ID, Security Type, and so forth. In addition, the Instrument base entity is associated with the groupings of parameters within the Order Book base entity that define categories of order books, and thus, the associated trading practices. A user is required to select one or more order book categories and attach the selected categories to the categories of instruments. In this way the system is told how the respective categories of instruments trade, that is, how the categories are treated under the rules—specifically, as the rules operate in terms of the selected order book category.

The Fields base entity differs from the other base entities in the sense that it is associated with the parameters for all of the fundamental operations and elements. Through the GUIs associated with the Fields base entity, the user creates, modifies or removes fields, or parameters, that are associated with one or more of the other base entities, as discussed in more detail below with reference to FIG. 25.

The trading cycles base entity entry 1723 provides to the user the GUIs that are associated with adding, viewing and/or editing the business logic rules, that is, the GUIs discussed in Section B. The Watch base entity entry 1724 provides to the user the GUIs that are associated with setting up and/or changing a Market Watch, as discussed below with reference to FIGS. 36-39.

The base entities 1711-1714, are associated with respective static database tables that are part of the database 16 (FIG. 1). Thus, there is a New Order static table, an Instrument static table and so forth. Each static database table includes columns, i.e., database fields and sub-fields, for certain parameters that must be included in every category within the associated base entity. These parameters are used by the system to link the base entity categories to rules that apply or relate to the base entity. A given static table includes rows for the user-defined categories of the associated base entity, or in the case of the Field static table the attributes of the fields. Thus, the Instrument static table includes rows for the respective categories of instruments that are defined by the user, e.g., Security, Equity, and so forth. Each time the user adds a new category to the Instrument base entity, the dynamic parameter manager 19 adds a new row to the Instrument Static Table. Similarly, each time a category is deleted, the dynamic parameter manager deletes the corresponding row of the static table. Also, the dynamic parametric manager creates a dynamically configurable database table for each new category, the table includes columns for the respective fields, or parameters, that the user has included in the definition of the category. In addition, the dynamically configurable table may include one or more columns pointers to tables for related categories created within other base entities, as discussed in more detail below.

The dynamically configurable category database table includes rows for the respective instances of the category, as discussed in more detail below. The instances provide the information that populates the associated category dynamically configurable database table. Through the various pointers and links to the category table, the data are also available to other database tables, and thus, for use in the various associated business logic rules.

Referring still to FIG. 17, the GUI 1700 allows a user to add a new definition of a category that is, add a new category, copy the definition, edit the definition, view a definition and delete a category definition by using the associated buttons 1726 to bring up the respective GUIs, as discussed in more detail below. The various categories that have been created by the user within the base entity are represented by icons 1728. The illustrative GUI 1700 is associated with the base entity Instruments.

When a user selects a particular instrument category icon 1728 and the view definition button 1726, the system presents to the user a GUI 1800 (FIG. 18) from which the user can view the definition of the category in terms of the fields that constitute the definition. The user may instead view general information about the category, or the order books that, as discussed below, are selectively associated with the category using buttons 1806 or 1808.

The GUI 1800 includes a listing 1802, which in table form includes entries for the respective parameters, or fields, 1804 that constitute the definition of the category. The entry for a given field includes, in table columns 1802, information about the pertinent properties of the field. Certain properties of a given field may be modified in the definition by the user. For example, the user may change the required to be filled-in properly by editing the appropriate column entry from true to false.

If the user activates the general button 1806, the user views the category definition through a GUI 1900, which includes a list 1902 with entries 1904 that contain information associated with the category. In the example of the Instrument category, the general information includes an entry "order book def" which has a pull-down menu that is activated by tab 1906. This entry lists the order books, that is, the order book categories defined within the order book base entity, that the user has selectively associated with the instrument category. By selecting the order book categories for inclusion in the definitions of the respective instrument categories, the user essentially specifies the trading practices for all instruments defined with the category.

To allow the user to select the order books for an instrument category, the dynamic parameter manager provides the order book button 1808 in the GUIs associated with the instrument base entity. A user activates the order book button and is provided with a GUI 2000 (FIG. 20) through which the user selects one or more categories of order books. The dynamic parameter manager then links the instrument category database table with the database tables for the selected order book categories, such that the system determines, through the link how to treat the particular category of instruments. Through the link the information contained in the instrument category database table is also available to the rules associated with the selected order book categories. The user may thereafter also change the selection of order books using the same GUI.

Referring now to FIG. 21, to create a new category of Instrument, the user clicks on the add a new definition button on the GUI 1700 (FIG. 17). In response, the GUI 2100 is provided to the user, who fills in the requested information in the list 2102. The user then activates the Fields button 1807 and the system provides the GUI 2200 illustrated in FIG. 22. The GUI 2200 lists in a table 2202 the fields required for every instrument, and the user may then modify the properties of one or more of the fields by making changes in the columns of the table 2202, as appropriate. The user may also activate the attach button 2204 to add new fields to the definition.

After activation of the attach button 2204, the user is presented with a GUI 2300 (FIG. 23) that includes a list 2302 of all of the fields that are available for addition to the definition of the category. The list includes every user-defined field, that is, every parameter that the user has defined under the base entity Field. The user then selects the particular fields for inclusion in the definition from the list by checking the corresponding boxes 2304 and clicks on "ok" to add the fields to the definition that is being created. The user is then returned to the GUI 2100 and the newly added fields are displayed in the list 2200 as lighter background entries. The user may remove any non-required field, including one of the newly added fields, from the definition by selecting the field and clicking on the remove button 2206.

To view or modify an attached field, the user double clicks on the appropriate entry in the list 2202 and is provided with a list of the attributes of the selected field in a GUI 2400. The GUI 2400 lists the properties of the field, including whether the field can be used as a parameter in the business logic rules, the group with which the field is associated for example, general, required, yield, or some other grouping specified by the user. The grouping information is provided for ease of creation of the instances, as discussed in more detail below.

When the user adds the category to the base entity, the dynamic parameter manager adds a row to the static Instrument base entity table and creates a dynamically configurable database table for the category. The category database table includes columns for the respective fields included in the category, and each instance created within the category then becomes a row in the category database with specific values given to the fields.

The dynamic parameter manager can readily link each newly created instrument category and instance with the rules that are associated with appropriate trading practices, through messaging that informs the appropriate entities that a new category of instrument has been created, and the new category is traded in accordance with the rules that are associated with the selected defined order book. The order book categories are linked to categories that are defined in other base entities, for example, amend order categories, cancel order categories and so forth. Accordingly, messages are sent to the various entities that the new category of instrument has been created and instances thereof should be processed in accordance with the rules that are associated with the defined categories that are linked through the order book with the instrument category. For the purpose of communicating these messages new tables, fields and sub-fields are dynamically created in the middleware. The tables are thereafter deleted when necessary modifications are done.

A user may add fields that can then be included in the definitions of the categories created within the various base entities. To do this, a user selects the fields entry from the list of base entities in GUI 1700 (FIG. 17). The system provides a GUI 2500 (FIG. 25A) through which the user supplies the information that characterizes the new field. The user can then use an associated field properties GUI (FIG. 25B) to specify the field attributes, including whether or not the field is to be used for the rules. When the field is created, the user may assign the field to a field category, such that the field will, for the convenience of the user, be displayed in a particular portion of the GUIs e.g. (FIG. 30) that are used to define instances. This ability to create and modify fields gives the system the flexibility and configurability that allows new parameters to be included in existing or new categories of the base entities and allows the rules to operate with the new or revised categories without requiring the rewriting or reconfiguring of the application software.

Figure 26:
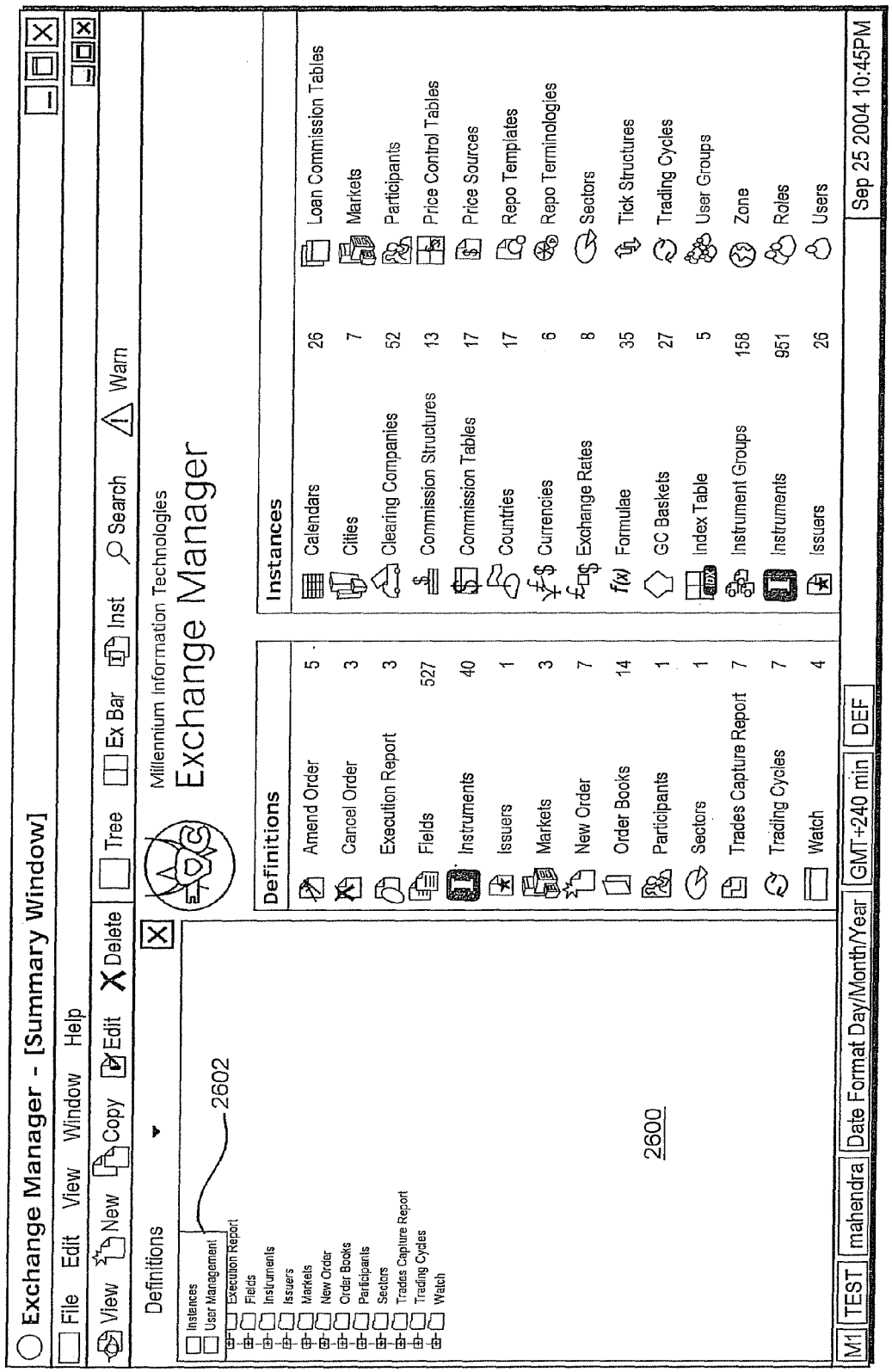

Referring now to FIG. 26, when the dynamic parameter management system is operating in either definition mode or trading mode a user creates or defines instances of the categories, and the information from the instances is used to populate the various fields and sub-fields of the database 16 (FIG. 1).

Figure 27:
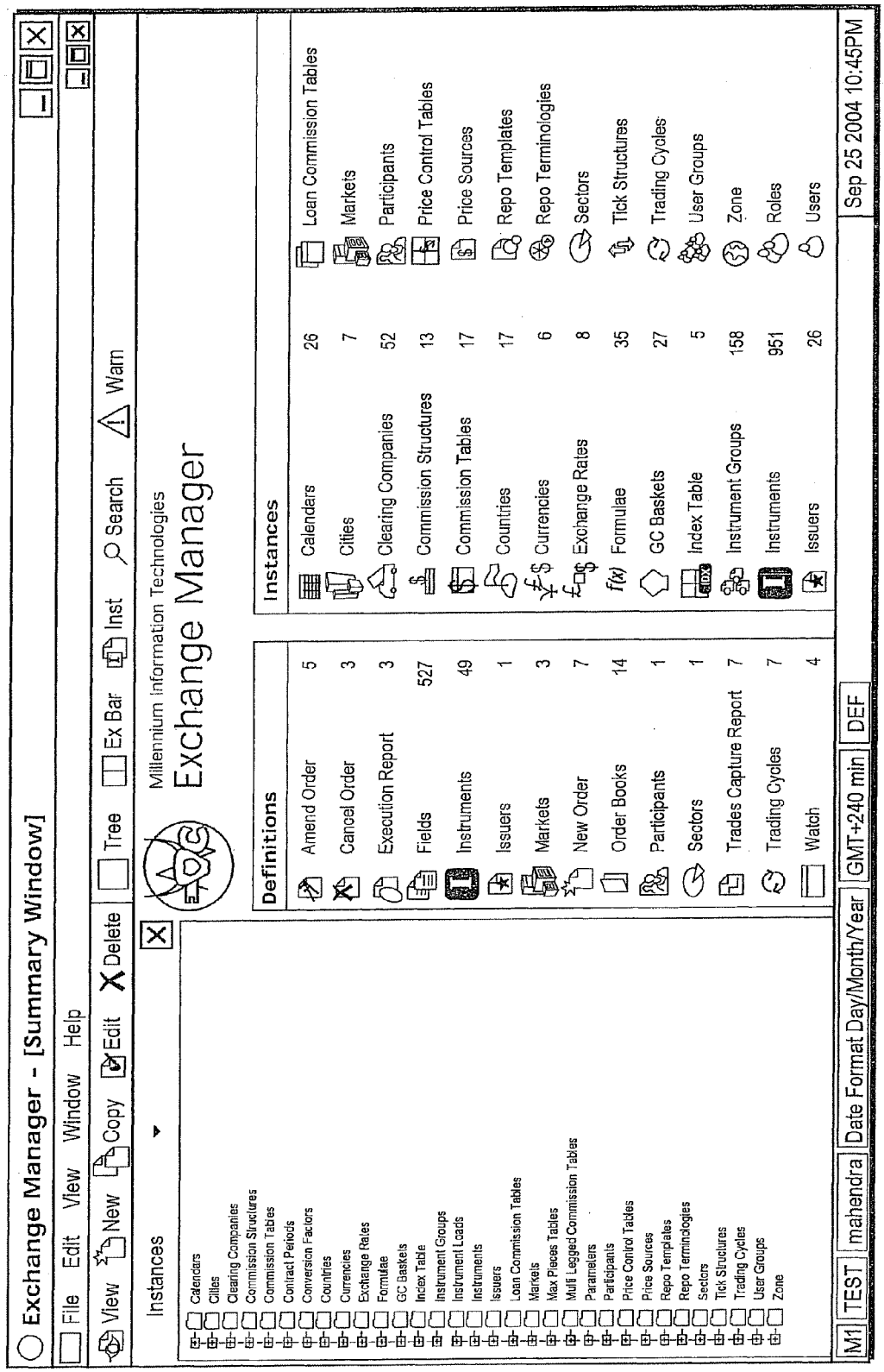
Figure 28:
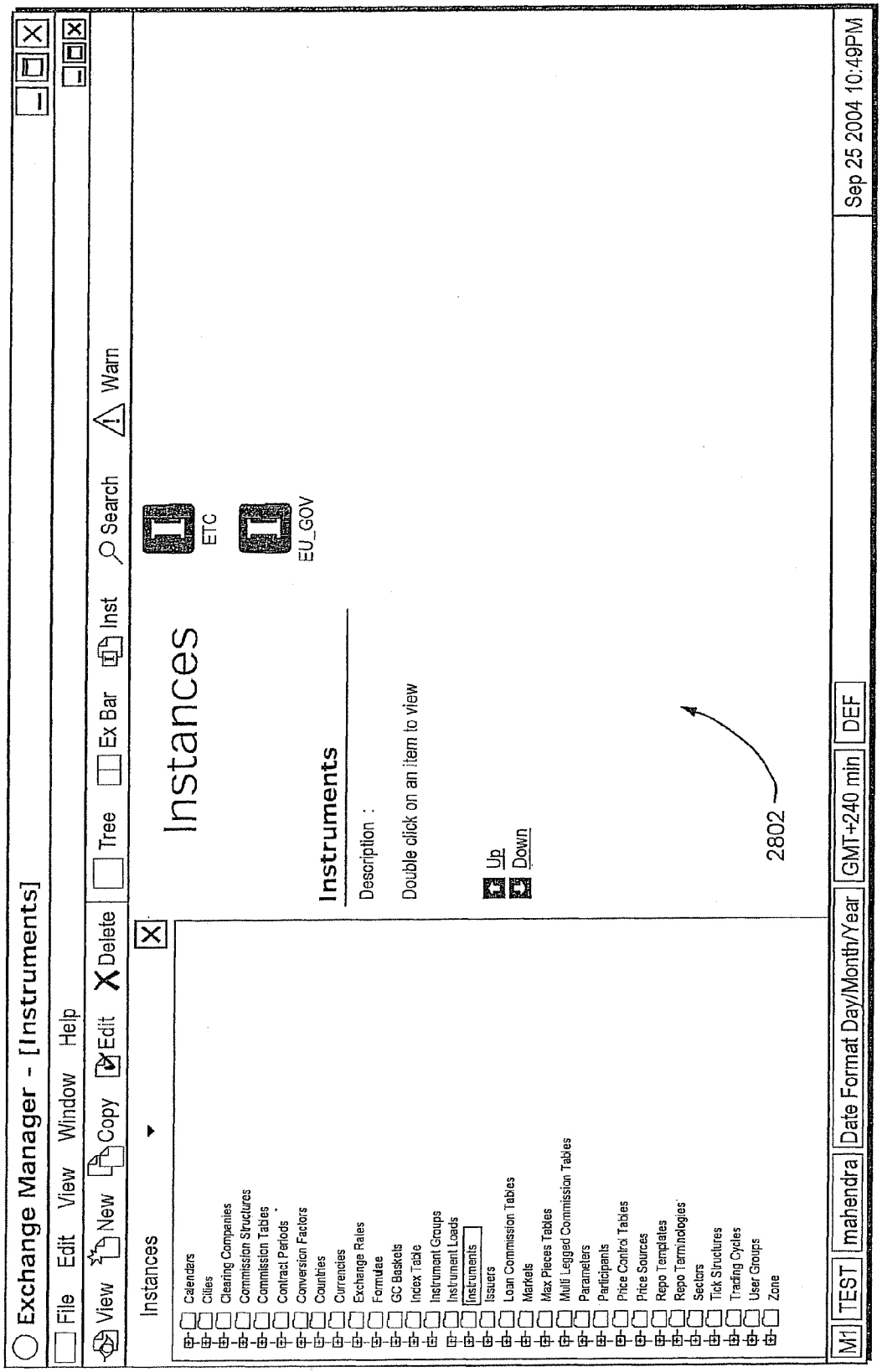

The user creates, for example, an instance of an instrument category by first selecting "instances" from the pull-down menu 2602 in the GUI 2600. Once the user has selected instances from the pull-down menu 2602, the user selects the base entity, in the example, Instruments, from a list 2702 in a next GUI 2700 (FIG. 27). The selection provides the user with a GUI 2800 (FIG. 28) that includes the icons 2802 associated with the categories included in the base entity. By selecting a category the user is provided with a GUI 2900 (FIG. 29) through which the user may add, copy, edit, view, or delete an instance from the selected instrument category. By selecting add an instance, the user is presented with a GUI 3000 (FIG. 30) through which the user can supply the information necessary to create the instance. In the example, the user is adding an instance to the US_Bill instrument category. The user thus provides details for the various displayed fields 3002, such as the trading symbol in the Symbol field, and so forth, and enters the information by clicking on the Add button. The dynamic parameter manager 19 (FIG. 1) then creates an associated row in the US_Bill dynamically configurable database table and enters the information in the appropriate columns. Instances may also be created by copying an instance, changing certain of the details such as the trading symbol, and adding the record by clicking on the Add button.

The new row of the dynamically configured US-Bill database table is, in turn, associated through a linked to a dynamically configured order book database table that contains parameters that are needed for various trading and reporting rules. The trading system is thus made aware of how to trade the newly identified bill.

The user may also manage access to the system by other users, in the example defining "roles" and assigning the roles to specific users or groups of users, such as brokerage firms and individual brokers, as instances of the defined roles. The dynamic parameter system then creates the appropriate database tables and through the tables associates the users or groups of users with rules that control their business activities.

The dynamic parameter manager also allows a user to manage user-access to the system through a hierarchical arrangement of GUIs that are based on defining instances of Roles and linking Users to the roles either individually or through user-defined groups. The dynamic parameter manager creates a dynamically configurable database table for the instances of the roles and links user instances and/or usergroups instances to the appropriate rows of the database roles table, as described in more detail below.

Referring again to FIG. 26, a user selects the User Management entry from the pull-down menu 2602 to mange access to the system. The selection provides the user with a GUI 3100 (FIG. 31) through which the user may add new instances, and/or copy, edit, view, delete existing instances of roles. If the user then selects to add a new instance using the appropriate button 3102, the user is provided with a GUI 3200 (FIG. 32). The GUI 3200 includes boxes 3202 and 3203 for entering a role ID and a Description of the role instance. Further, the GUI includes a listing of the General Privileges that the user may selectively include in the role instance definition. The user may select all or any combination of the general privileges and assign them to the definition by checking the appropriate boxes 3205 in the rows 3207 of the General Privileges table 3208. The general privileges are arranged under column headers 3209 that follow the organization of activities in the user's underlying business plan. In the illustration, the column header "Other" is expanded, and the user may selectively include the listed Other privileges in the definition. Similarly, the remaining column headers may be expanded such that the user can selectively include in the definition the associated listed privileges such as selected trader privileges.

In addition, the user may include in the definition of the role instance selected Group Privileges, which relate to the privileges a given user has with respect to, for example, his own orders and/or the orders of others in the same user-group. The user thus activates the Group Privileges button 3205 and is provided with a GUI 3300 (FIG. 33), which includes a table that lists the available group privileges. In the illustration, the column header "Others" has been expanded to show the included privileges. The user then selectively adds group privileges to the role instance definition by clicking on the appropriate boxes and adding the selections using the Add button.

Figure 34:
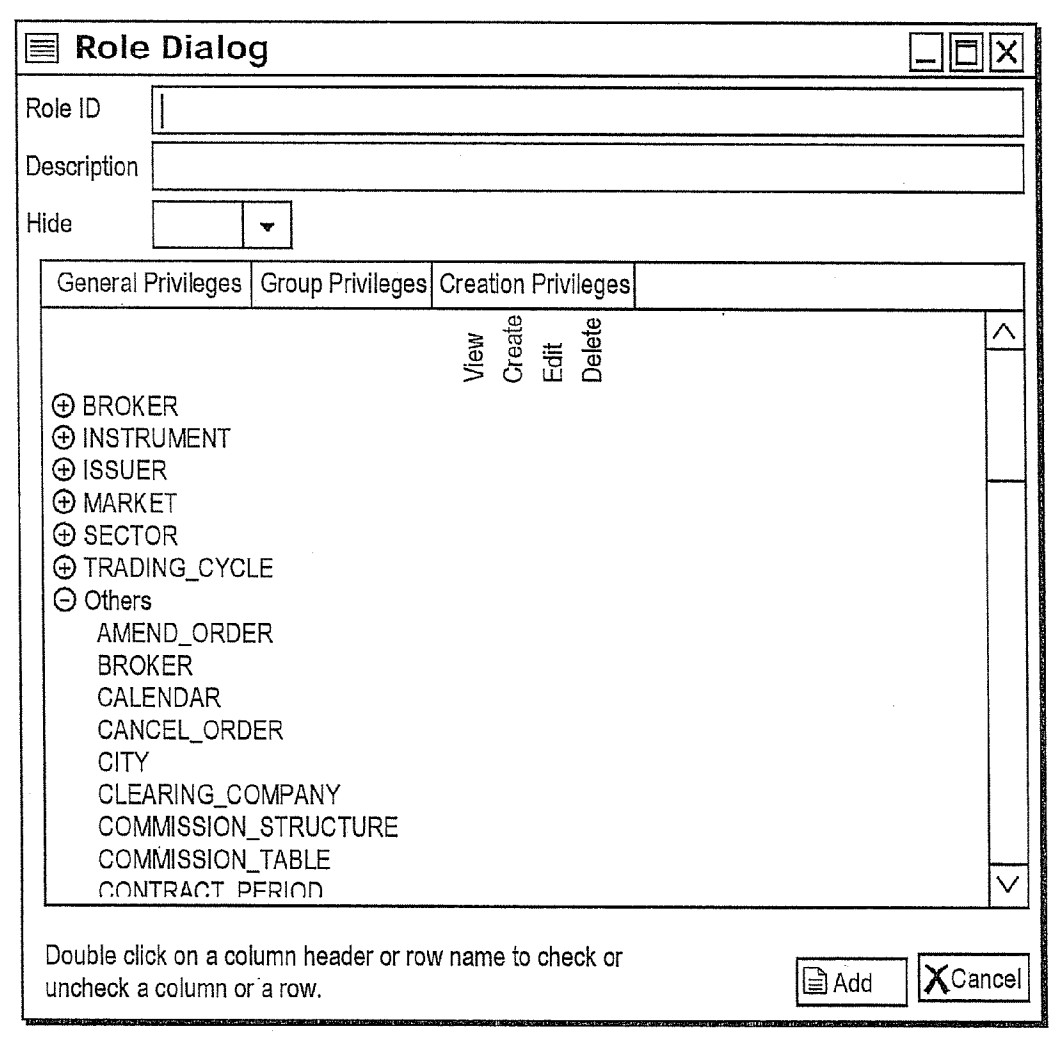

The user may also add to the role instance definition Creation Privileges, which are privileges associated with viewing, creating, editing, or deleting the definitions of categories and/or instances. By activating the Creation Privileges button 3206, the user is provided with the GUI 3400 (FIG. 34). The GUI 3400 includes a list with column headers for various elements or operations associated with the business activities. The column headers may be expanded to listings of the associated categories and instances to which the privileges of viewing, creating, editing and/or deleting may be selectively attached in the role instance definition by "checking" the appropriate boxes.

Figure 31:
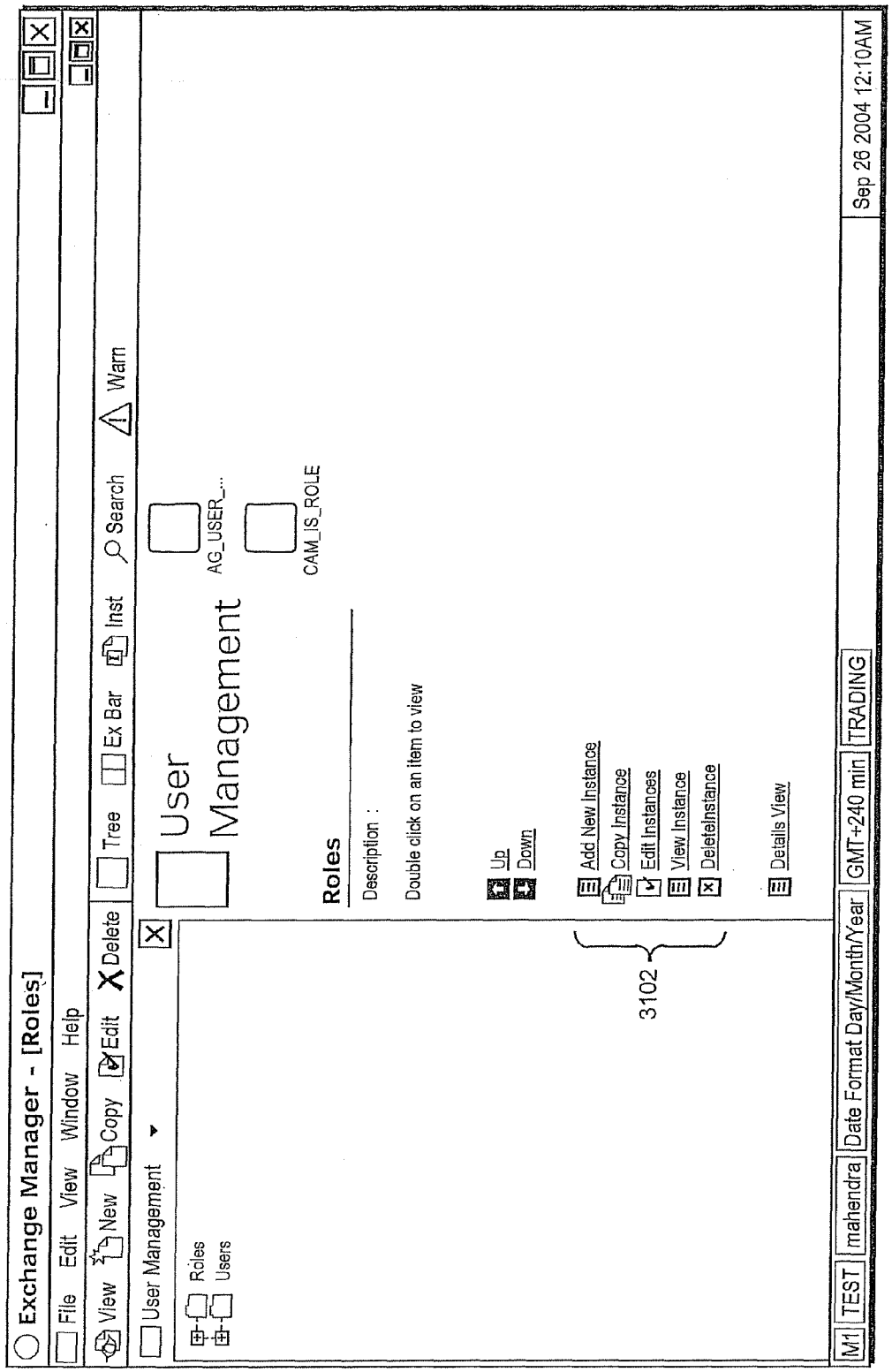
Figure 32:
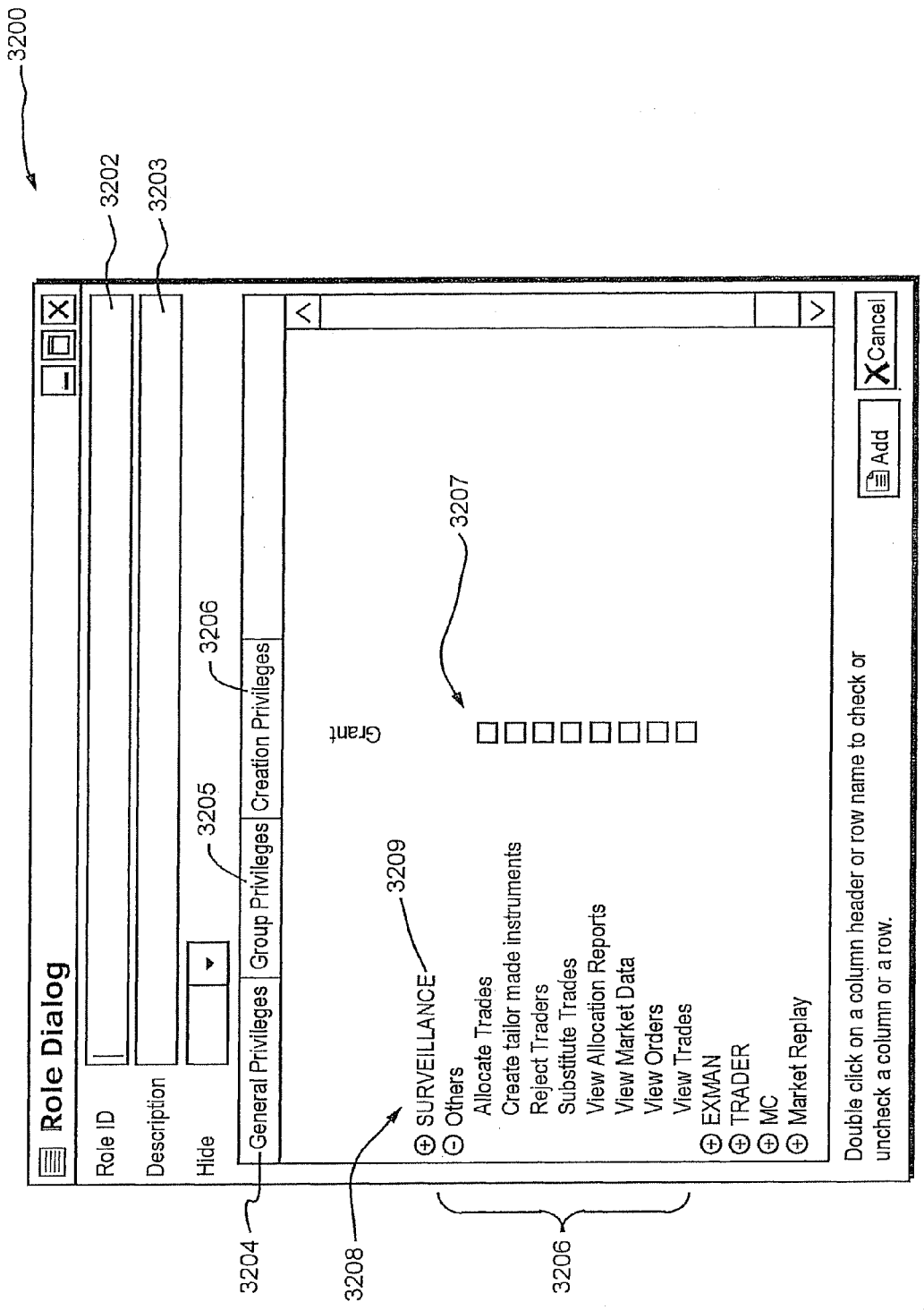
Figure 35:
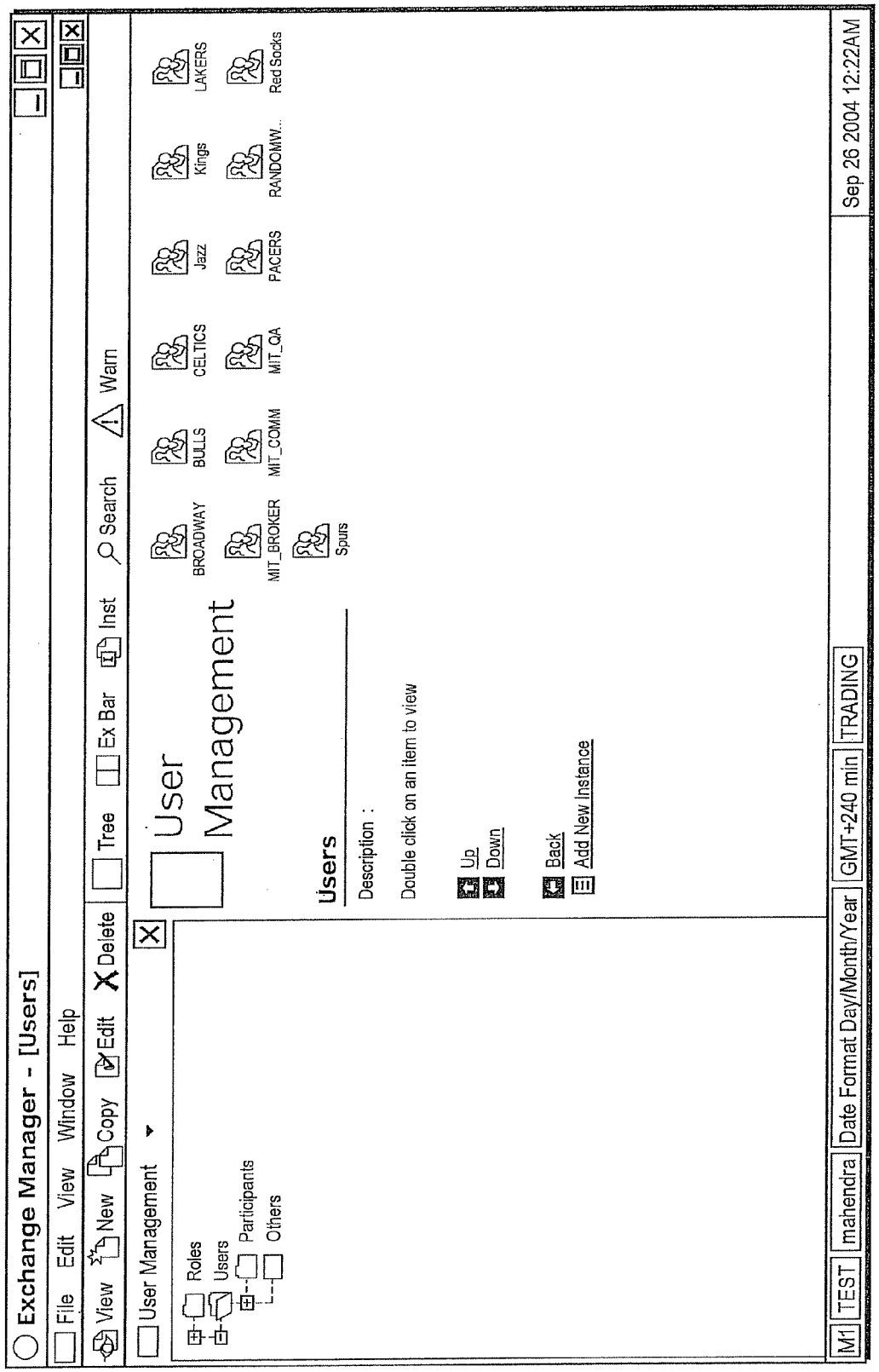
Figure 36:
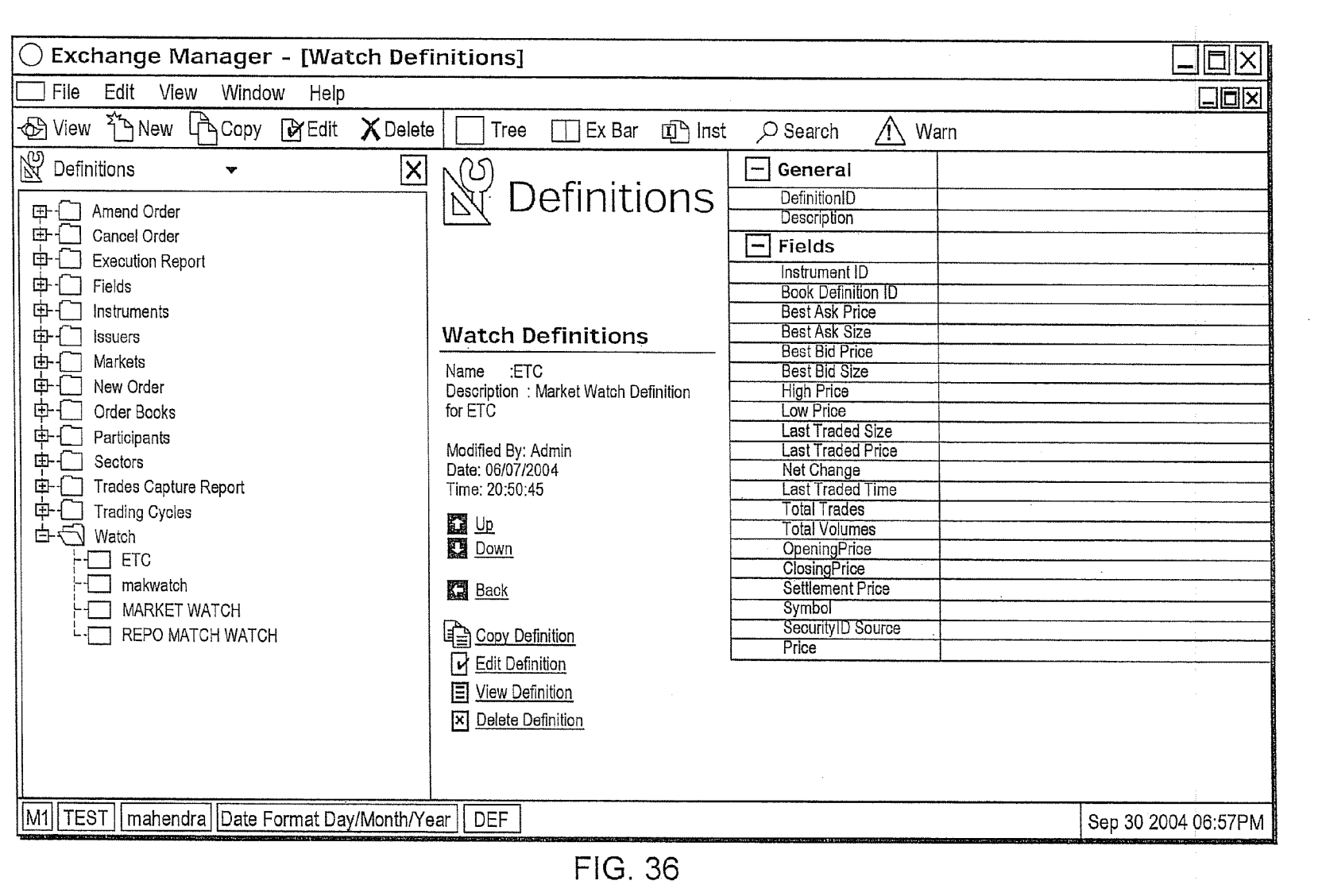
Figure 37:
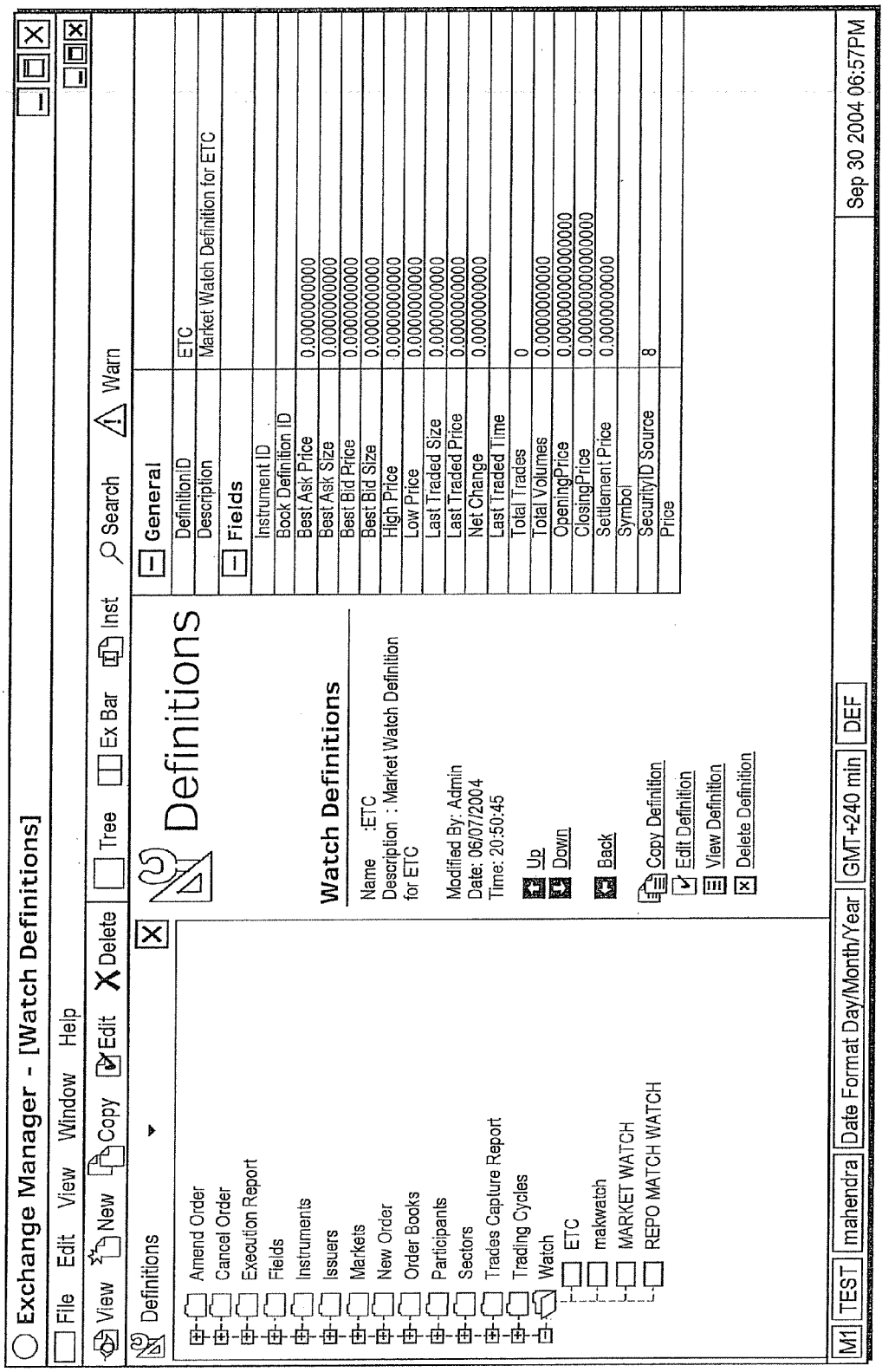

The user-groups and individual user instances may be defined and then linked to the defined roles through GUIs that are accessed by selecting Users from a pull-down menu 3104 ((FIG. 31). The GUI 3500 (FIG. 35) allows user instances to be selectively added. For each instance added, a GUI 3600 (FIG. 36) is provided, through which privileges are assigned. The user-groups and the constituent users are linked through a hierarchy node entry 3503 in the listing 3502 that is included in GUI 3500 (FIG. 35). Similarly, the new user instances are linked to the roles through the role ID list entry 3605.

The dynamic parameter manager creates linked tables of roles, user-groups and users that together define the privileges granted to a given user, for example, a given broker. A given broker, as a member of a particular brokerage firm and so forth may have all or certain of the privileges granted to the brokerage firm, a department of the brokerage firm and so forth, all as indicated through the information and links in the roles and user database tables created by the dynamic parameter manager based on the selections made through the hierarchy of associated GUIs. As discussed, middle ware messaging is used to provide information about the new users and user-groups to the appropriate system.

Once the parameters, base entity categories and instances, and the rules are defined, they are saved by the system. At the start of a trading day, each trading process loads the relevant parameter and rules information to its memory. When a client sends in an order, the receiving process interprets and processes the order in accordance with the appropriate rules for validation, matching, and so forth that are associated with the order based on the particulars of the order, such as the trading symbol and so forth.

The operations of the user management aspect of the system are set up in accordance with the organization of the underlying business. The various roles, user groups and user instances and the categories in which they are created may be altered and/or set up in the same manner as the categories and instances of the base entities and so forth described above.

The system further allows a user to define a market watch through a hierarchy of GUIs available through the activation of the Watch button on the definitions GUI 1700 (FIG. 17). Through the GUIs illustrated in FIGS. 36-39, the user selects parameters to include in the definitions of market watch categories. The dynamic parameter manager then sets up the appropriate database tables and links the tables with the appropriate entities to allow the system, at the start of a trading day, to process incoming market data and data generated by other base entities and the categories created within them, such as Trades Capture Report and Execution Report, to produce the corresponding market watch or watches for the user.

The system described above thus provides the user with the ability to change base entity definitions, create new definitions and so forth, including the assigning of attributes to the various database fields and sub-fields that define the parameters, which are then selectively grouped to define the base entities. The system readily accommodates new groupings of parameters to re-define existing base entities or add new base entities, and further to define categories within the base entities. As discussed, certain parameters may be defined as required and others may be selectively included in the definitions of the respective categories. Instances of the categories are then defined by associating particular values with the parameters that are included in the category definitions. The system accommodates the definitions of the base entities, categories and instances by creating, linking and maintaining static and dynamically configurable database tables, and making the tables available to the business logic rules. The rules then utilize the information in the tables to perform their various operations. As the rules change or update, the parameter, base entity and category definitions may but need not be similarly changed or updated. Thereafter, the various rules continue to utilize the database tables, and thus, operate without requiring re-configuration of the underlying applications.

The foregoing description has been limited to a specific embodiment of this invention. It will be apparent, however, that variations and modifications may be made to the invention, with the attainment of some or all of its advantages, for example, modules or subsystems depicted separately may be combined or may be composed of a plurality of components. Therefore, it is the object of the appended claims to cover all such variations and modifications as come within the true spirit and scope of the invention.

What is claimed is:

1. A system including one or more processors for dynamically managing parameters for use in business logic rules in an application program executed by one or more of the processors, the system including:
   an application program executed by one or more of the processors for executing the business logic rules using system hardware and software;
   a dynamically configurable database that includes fields and sub-fields that correspond to parameters that are associated with the business logic rules;
   a dynamic parameter manager module for
      providing to a user a mechanism to define the parameters using the fields and sub-fields of the dynamically configurable database and define groupings of parameters to define base entities, the base entities including categories that are associated with the respective groupings of the parameters, and correspond to respective rows in static database tables that are associated with the base entities, and the columns of the tables correspond to the fields and sub-fields that correspond to the groupings of the parameters that are associated with the respective base entities;

making the groupings of the parameters available to the business logic rules, and providing the parameters to the application program, the dynamic parameter module further creating dynamically configurable database tables for the respective categories, and including columns for the parameters that are included in the definitions of the respective categories, associating the fields and sub-fields required for the definition of a new category of a given base entity with columns in the associated dynamically configurable database table, incorporating into the dynamically configurable database table changes to the required fields and sub-fields, associating additional fields and sub-fields with the new category definition by including new columns in the dynamically configurable database table, incorporating the new category in the given base entity by adding a new row to the static database table associated with the base entity, and linking the new category to related categories in other base entities.

2. The system of claim 1 wherein the dynamic parameter manager module further provides, for selection of the fields and sub-fields to associate with the category, a list of all parameters that are defined under the associated base entity.

3. The system of claim 2 wherein the dynamic parameter manager module lists for the respective fields the associated attributes.

4. The system of claim 1 wherein the dynamic parameter module creates instances of the categories by adding rows to the associated dynamically configurable database tables and entering associated information in the columns of the added rows.

5. A method for dynamically managing parameters for use in business logic rules in an application program, the method comprising the steps of:

stating the business logic rules as expressions in a functional language that utilizes parameters that correspond to lookup fields in an associated dynamically configurable database;

creating static and related dynamically configurable database tables for user-defined parameters and groups of parameters using the fields and sub-fields of the dynamically configurable database to define base entities, categories of base entities and instances of the categories for use with the business logic rules, and adding to the database tables the new fields and sub-fields of the dynamically configurable database, re-grouping the parameters to correspond to changes in the business logic rules by changing the fields and sub-fields associated with respective database tables, creating rows of the base entity database table for the respective categories, with the columns of the base entity table corresponding to the groupings of the fields and sub-fields that are associated with the respective base entities, creating dynamically configurable database tables for the respective categories, the dynamically configurable database tables including columns for the parameters that are included in the definitions of the respective categories and associating the fields and sub-fields required for the definition of a new category of a given base entity with columns in the associated dynamically configurable database table, incorporating into the dynamically configurable database table changes to the required fields and sub-fields, associating additional fields and sub-fields with the category definitions by including new columns in the dynamically configurable database table, incorporating the new category in the given base entity by adding a new row to the database table associated with the base entity, and linking the new category to related categories in other base entity data base tables, and providing the database tables to the application.

6. The method of claim 5 further including providing, for selection of the fields and sub-fields to include in the category, a list of all parameters that are defined under the associated base entity.

7. The method of claim 6 further including listing for the respective fields associated attributes.

8. The method of claim 5 further including creating instances of the categories by adding rows to the associated dynamically configurable database tables and entering associated information in the columns of the added rows.

* * * * *

UNITED STATES PATENT AND TRADEMARK OFFICE
CERTIFICATE OF CORRECTION

| | | |
|---|---|---|
| PATENT NO. | : 8,099,441 B2 | Page 1 of 1 |
| APPLICATION NO. | : 11/240157 | |
| DATED | : January 17, 2012 | |
| INVENTOR(S) | : Lakshitha C. Surasinghe | |

It is certified that error appears in the above-identified patent and that said Letters Patent is hereby corrected as shown below:

Column 1, line 56 after "so" delete "is";
Column 18, line 41 after "fields" add the.

Signed and Sealed this
Tenth Day of April, 2012

David J. Kappos
*Director of the United States Patent and Trademark Office*